US008983071B2

(12) United States Patent
Han et al.

(10) Patent No.: US 8,983,071 B2
(45) Date of Patent: Mar. 17, 2015

(54) KEY MANAGEMENT METHOD USING HIERARCHICAL NODE TOPOLOGY, AND METHOD OF REGISTERING AND DEREGISTERING USER USING THE SAME

(75) Inventors: Sung-hyu Han, Seoul (KR); Bong-seon Kim, Seongnam-si (KR); Myung-sun Kim, Uiwang-si (KR); Young-sun Yoon, Suwon-si (KR); Sun-nam Lee, Suwon-si (KR); Jae-heung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1819 days.

(21) Appl. No.: 11/348,313

(22) Filed: Feb. 7, 2006

(65) Prior Publication Data

US 2006/0177066 A1 Aug. 10, 2006

Related U.S. Application Data

(60) Provisional application No. 60/650,127, filed on Feb. 7, 2005.

(30) Foreign Application Priority Data

Mar. 16, 2005 (KR) ........................ 10-2005-0021845

(51) Int. Cl.
*H04L 9/00* (2006.01)
*H04L 9/08* (2006.01)
(Continued)

(52) U.S. Cl.
CPC ............ *H04L 9/0836* (2013.01); *H04L 63/061* (2013.01); *H04L 2463/062* (2013.01);
(Continued)

(58) Field of Classification Search
CPC ............... H04L 9/3073; H04L 2209/60; H04L 63/0442; H04L 63/062; H04L 63/0823; H04L 9/0891; H04L 9/3273; H04L 2209/56; H04L 47/10; H04L 47/20; H04L 9/083; H04L 9/3268; H04L 12/66; H04L 2209/20; H04L 63/126; G06F 21/10; G06F 21/32; G06F 21/64; G06F 2221/2101; G06F 2221/2113; G06F 2221/2117; G06F 2221/2129; G06F 2221/2137; G06F 7/725; H04W 88/18; H04W 8/08; H04W 12/06; H04W 28/04; H04W 40/02; H04W 60/00; H04W 74/00; H04W 80/00; H04W 80/04; H04W 8/087
USPC ........... 380/259, 260, 278, 279, 283, 281, 45, 380/285, 28, 44, 282, 29, 30, 277; 370/254, 370/331
See application file for complete search history.

(56) References Cited

U.S. PATENT DOCUMENTS 4,888,801 A 12/1989 Foster et al.
6,226,618 B1 * 5/2001 Downs et al. ..................... 705/1
(Continued)

FOREIGN PATENT DOCUMENTS

EP 0851629 A2 7/1998
EP 1 083 699 A1 3/2001
(Continued)

OTHER PUBLICATIONS

Communication dated Aug. 19, 2013 issued by the European Patent Office in counterpart European Patent Application No. 06715877.4.

*Primary Examiner* — Thanhnga B Truong
(74) *Attorney, Agent, or Firm* — Sughrue Mion, PLLC

(57) ABSTRACT

A key management, user registration and deregistration for a digital rights management (DRM) system in a home network, using a hierarchical node topology. In the key management, node information is generated by allocating a pair of keys (a public key and a private key) to each node. A node tree is made by generating link information using the pair of keys and a content key. The link information is delivered from an upper node to a lower node using the node tree. The link information is obtained by encrypting a private key of a 'TO' node using a public key of a 'FROM' node. Accordingly, it is possible to realize a DRM system that protects content and easily accomplishes a binding mechanism and a revocation mechanism.

17 Claims, 27 Drawing Sheets

(51) Int. Cl.
  *H04L 29/06* (2006.01)
  *H04N 7/167* (2011.01)
  *H04N 21/2347* (2011.01)
  *H04N 21/258* (2011.01)
  *H04N 21/266* (2011.01)
  *H04N 21/436* (2011.01)
  *H04N 21/4367* (2011.01)
  *H04N 21/4405* (2011.01)
  *H04N 21/6334* (2011.01)
  *H04N 21/8355* (2011.01)

(52) U.S. Cl.
  CPC ......... *H04N7/1675* (2013.01); *H04N 21/2347* (2013.01); *H04N 21/25816* (2013.01); *H04N 21/2585* (2013.01); *H04N 21/26613* (2013.01); *H04N 21/43615* (2013.01); *H04N 21/4367* (2013.01); *H04N 21/4405* (2013.01); *H04N 21/63345* (2013.01); *H04N 21/8355* (2013.01); *H04L 9/0891* (2013.01); *H04L 2209/603* (2013.01)

USPC ............ 380/277; 380/278; 380/282; 380/30; 370/254; 370/331

(56) References Cited

U.S. PATENT DOCUMENTS

| | | | |
|---|---|---|---|
| 6,711,263 B1 * | 3/2004 | Nordenstam et al. | 380/282 |
| 6,834,110 B1 * | 12/2004 | Marconcini et al. | 380/239 |
| 2002/0150250 A1 | 10/2002 | Kitaya et al. | |
| 2002/0157002 A1 * | 10/2002 | Messerges et al. | 713/155 |
| 2003/0084306 A1 * | 5/2003 | Abburi et al. | 713/188 |
| 2003/0105956 A1 * | 6/2003 | Ishiguro et al. | 713/158 |
| 2003/0185399 A1 * | 10/2003 | Ishiguro | 380/281 |
| 2005/0169193 A1 * | 8/2005 | Black et al. | 370/254 |
| 2005/0228897 A1 | 10/2005 | Yamamoto et al. | |

FOREIGN PATENT DOCUMENTS

| | | |
|---|---|---|
| EP | 1 235 381 A1 | 8/2002 |
| WO | 2004/023812 A1 | 3/2004 |

* cited by examiner

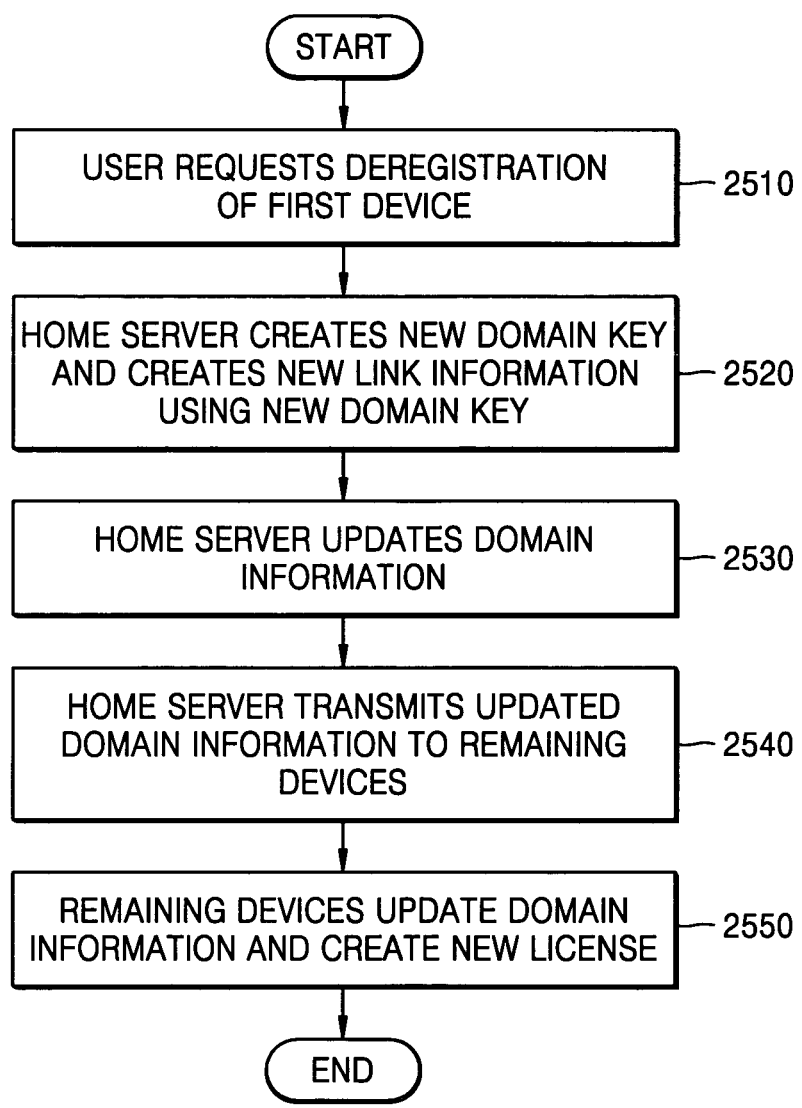

KEY MANAGEMENT METHOD USING HIERARCHICAL NODE TOPOLOGY, AND METHOD OF REGISTERING AND DEREGISTERING USER USING THE SAME

CROSS-REFERENCE TO RELATED PATENT APPLICATIONS

This application claims priority from Korean Patent Application No. 10-2005-0021845, filed on Mar. 16, 2005, in the Korean Intellectual Property Office, and U.S. Provisional Application No. 60/650,127, filed on Feb. 7, 2005, in the US PTO, the disclosures of which are incorporated herein in their entirety by reference.

BACKGROUND OF THE INVENTION

1. Field of the Invention

Methods consistent with the present invention relate to the digital rights management (DRM) of a home network and, more particularly, to key management using a hierarchical node topology, and registering and deregistering a user using the same.

2. Description of the Related Art

Generally, digital content is transmitted from a content provider to a user who can use the digital content only after acquiring a proper right by paying for the digital content.

FIG. 1 illustrates a home network. Referring to FIG. 1, a content provider CP transmits content to a home network HN via a transmission channel. The home network HN includes a home server HS and user devices D1, D2, and D3.

The home server HS initially receives the content via the transmission channel and controls the content to be used by the devices D1 through D3 according to a digital rights management (DRM) mechanism. That is, the home server HS is connected to the devices D1 through D3. The home server HS manages joining or withdrawing of an authorized user device to or from the home network HN and transmits the content only to an authorized user device, that is, to a currently registered device.

A domain indicates a set of user devices connected to a home server. The domain changes whenever the user devices join or leave the home network. In other words, the user devices connected to the domain are not fixed, and thus, a process of making a user device that left the home network unable to obtain any more content is required.

The content is encrypted using a content key and the content key is encrypted using a sharing key, and the content and the content key are transmitted to the user devices D1 through D3. Only user devices in the home network HN can acquire the sharing key.

As described above, the content is encrypted using the content key and the content key is distributed to only authorized users, thereby preventing unauthorized users from obtaining the content.

In recent years, the developments of home network technologies allow a user to exchange content between several user devices. Thus, the user sometimes desires to use content in all his user devices by paying for the content only once. However, if the content can be moved freely between devices in a reproducible way, an unauthorized user can acquire and use the content. Accordingly, there is a growing need to improve the home network technology so that content can be exchanged between user devices over a home network of an authorized user while preventing an unauthorized user from acquiring the content and using the content even if the unauthorized user acquires the content.

In particular, the U.S. Federal Communications Commission (FCC) requires, as of July 2005, a standard for digital broadcasting technology by which a 1-bit broadcast flag (BF) should be included into high-definition (HD) content to be broadcast through digital broadcasting throughout the U.S., so that content protection can be enabled when the BF of content is 1 to prevent unauthorized users from using the content. Therefore, there is an urgent need for a method for securely using digital broadcast content between a home server and a user device.

SUMMARY OF THE INVENTION

The present invention provides a key management method, and a method of registering and deregistering a user using the same, thereby effectively and securely performing digital rights management in a home network.

Exemplary embodiments of the present invention may overcome the above disadvantages and other disadvantages not described above. The present invention is not necessarily required to overcome any of the disadvantages described above, and the present invention may not overcome any of the problems described above. The appended claims should be consulted to ascertain the true scope of the invention.

According to one aspect of the present invention, there is provided a key management method using a hierarchical node topology in a home network. The method includes creating node information by allocating a pair of keys including a public key and a private key to each node, and generating link information using the pair of keys. The method further includes securely delivering a content key from an upper node to a lower node. The link information is obtained by encrypting a private key of a TO node using a public key of a FROM node.

The FROM node is a device node corresponding to a device of the home network. The link information is obtained by encrypting the private key of the TO node using a public confidentiality key of the device node, and a private confidentiality key corresponding to the public confidentiality key is possessed only by the device.

The FROM node is not the device node, and the link information is obtained by encrypting the private key of the TO node using a sharing public key of the FROM node.

Alternatively, the pair of keys may be replaced with a symmetrical key.

The delivering of the content key includes encrypting the content key using a revocation key; and encrypting the encrypted content key using the public key. The revocation key is selected from device keys that are not given to the revoked devices, and the device key is allocated to each device through broadcast encryption.

The key management method further includes encrypting the content key using the revocation key and the encryption domain key and transmitting the encrypted content key to device; and the device acquiring the content key using a revocation key extracted from a device key of the device and a decryption domain key. The decryption domain key is generated using the private confidentiality key of the device and the link information.

The encryption domain key is a sharing public key of a user. The acquiring of the content key includes obtaining the decryption domain key using the private confidentiality key of the device and the link information; and obtaining the content key by decrypting the encrypted content key using the decryption domain key.

The encryption domain key is the public confidentiality key of the device, and the acquiring of the content key includes binding content to the device by obtaining the content key using the private confidentiality key of the device and the link information.

According to another aspect of the present invention, there is provided a method of registering a user in a home network using a hierarchical node topology. The method includes generating a node tree upon a user request, creating a domain key; creating link information between nodes, using the domain key and a pair of keys such as a public key and a private key, allocated to each entity corresponding to a node of the node tree, and storing the domain key and the link information.

According to yet another aspect of the present invention, there is provided a method of registering a device using a hierarchical node topology in a home network. The method includes recognizing the presence of a new device by detecting a physical connection of the device to a user node or receiving a message from the device requesting to join the domain, generating link information regarding a link of the device to the user node by encrypting a domain key using a public key of the device received from the device, and transmitting the link information to the device.

According to yet anther aspect of the present invention, there is provided a method of deregistering a device in a home network using a hierarchical node topology. The method includes a user, via a user interface of a home server, requesting the home server to deregister the device, generating a new domain key, generating new link information using the new domain key, and updating domain information by deleting information regarding the device and changing the domain information when the device leaves a domain, and transmitting the changed domain information to the remaining devices in the domain. The domain information includes the new link information, detailed information regarding the domain, and information regarding members of the domain.

According to another aspect of the present invention, there is provided a method of deregistering a device in a home network using a hierarchical node topology. The method includes discovering a device to be removed from a domain when revocation information is updated, generating a new domain key, and updating domain information by generating new link information using the new domain key, and transmitting the domain information to devices that are members of the domain.

BRIEF DESCRIPTION OF THE DRAWINGS

The above and other aspects of the present invention will become more apparent by describing in detail exemplary embodiments thereof with reference to the attached drawings in which:

FIG. 25 is a flowchart illustrating deregistration initiated by a user according to an exemplary embodiment of the present invention;

DETAILED DESCRIPTION OF EXEMPLARY EMBODIMENTS

Figure 1:
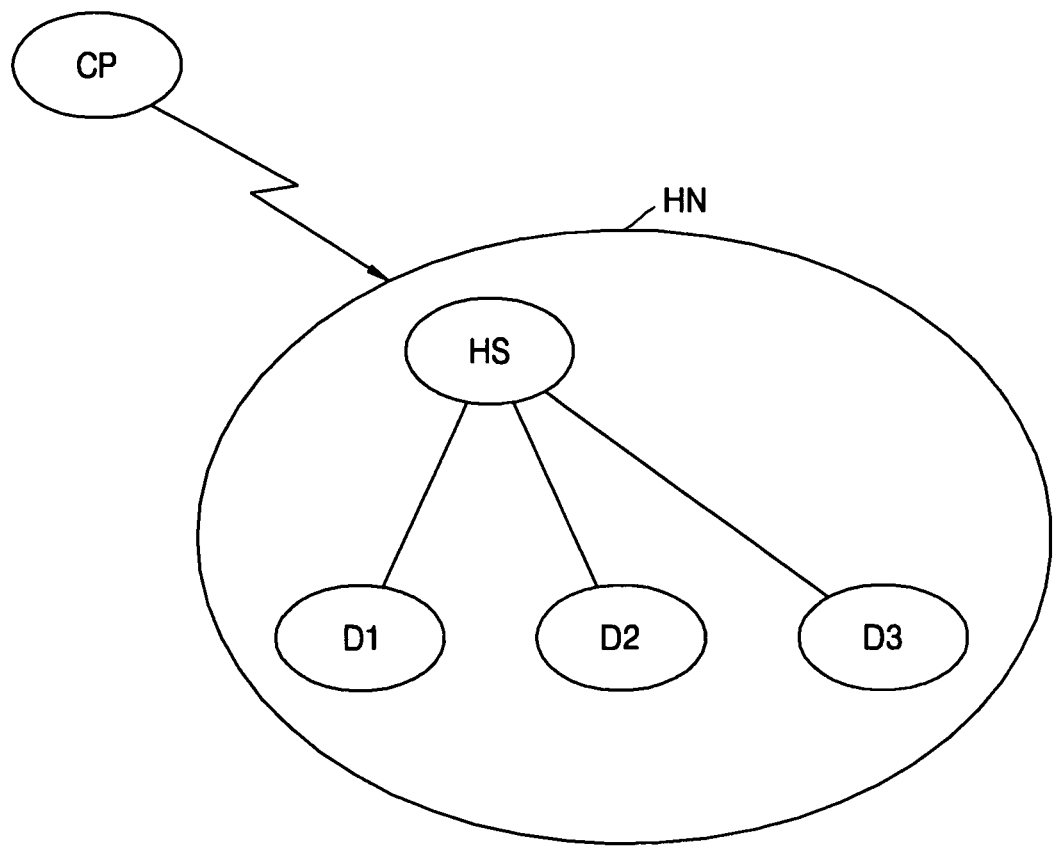
FIG. 1 is a diagram illustrating a home network according to an exemplary embodiment of the present invention.

Hereinafter, exemplary embodiments of the present invention will be described in detail with reference to the accompanying drawings, wherein same references refer to analogous elements throughout.

In this disclosure of the exemplary embodiments, words such as "must", "must not", "required", "shall not", "recommended", and "optional" are to be interpreted as defined in RFC2119.

To facilitate understanding of the exemplary embodiments, the following definitions are provided.

Home Network: The home network indicates a set of devices within a range in which digital rights management (DRM) of content is performed. A user may form a plurality of domains in a home network. Domain management is performed in units of domains. The term 'home' of the home network indicates all objects, including a household, on which DRM can be performed.

Domain: The domain indicates a unit of content management that a user makes for using content. In general, a domain key is allocated to a domain, and the structure of the domain can be explained using a node tree.

Domain Key: The domain key indicates a key used to encrypt a content key so that only devices belonging to a domain can acquire the content key.

Apparatus: The apparatus indicates any hardware constituting a domain. Each apparatus corresponds to a node and has a device key for a revocation algorithm. A device key is installed in each apparatus during manufacture thereof. An apparatus in a home network includes a home server and a device.

Home Server: The home server indicates an apparatus in which a domain manager that performs domain management (i.e., generation or resetting of a domain) in a home network is installed. The home server has a user interface and receives user input related to the domain management.

Device: The device indicates hardware that uses content in a home network. Use of content includes all actions such as reproduction, editing, and copying of content, to which the DRM must be applied.

Entity: The entity indicates a significant subject in terms of use of content in a home network. The entity is an object to be bound, a subject of a domain, and a subject of use of content. The entity may be a family, a user group, a user, a device domain, and a device.

Public Key and Private Key: The public key and the private key are used in a public key infrastructure (PKI), and are allocated to a user or a device. The public key can be acquired even by a third party, but the private key is allocated only to a user or a device. If information is encrypted using the public key, the information can be reproduced by decoding it using the private key. By way of an example, two pairs of public and private keys may be used such as a pair of sharing keys including a public sharing key and a private sharing key and a pair of confidentiality keys including a public confidentiality key and a private confidentiality key. Although they are used for different purposes and thus given different names, the functions of the pair of sharing keys are the same as those of the pair of confidentiality keys.

Further, each node corresponds to a content-bound entity. A domain manager of a home server performs key management, and performs domain management using key management. A node architecture has nodes i.e., a node topology, and will now be described with reference to FIGS. 2 through 6.

A node topology is explained using a node tree. The node tree is comprised of a hierarchical set of upper nodes, middle nodes, and lower nodes. In the node tree, nodes with different levels are linked to each other. A node contains node information and a link contains link information.

In an exemplary embodiment of the present invention, content is bound to a user to maximize user's experience in using the content in an easy and convenient way without violating DRM regulations. However, this binding rule cannot always be applied, for instance, cable content of copy-once copy control information (CCI) must not be bound to a user. Accordingly, the content may be bound to either a user or a device, but device binding is performed only when user binding is against the DRM regulations.

There are two entities joining a domain: a user and a device. Each entity corresponds to a node, and a link between two nodes is represented by an arrow. Content biding is indicated by a line segment. If content is bound to the user, the content and a user node are connected by the line segment, and if the content is bound to the device, the content and a device node are connected by the line segment. A user node with a device node linked to the user node is referred to as a domain. The user may limit the number of devices that can join a domain, and use his or her content in a device in his or her domain.

Figure 2:
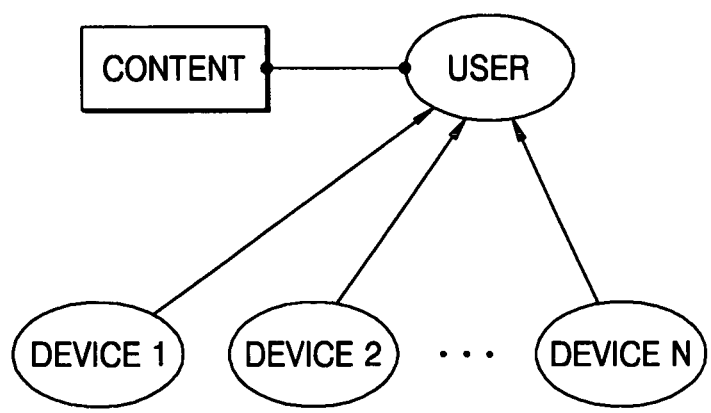
FIG. 2 is a diagram illustrating a fundamental, initial node topology according to an exemplary embodiment of the present invention.
Figure 3:
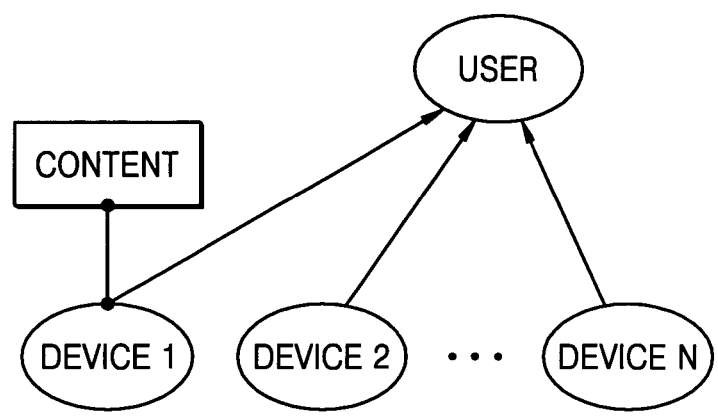
FIG. 3 is a diagram illustrating a fundamental, initial node topology according to another exemplary embodiment of the present invention.

FIGS. 2 and 3 are diagrams illustrating examples of node topology. Referring to FIGS. 2 and 3, the node topology includes entities joining a domain at an initial stage in which only one user node can join the domain.

Referring to FIG. 2, content is bound to a user. In this case, the content may be stored in any storage device in the domain and used by any device in the domain.

Referring to FIG. 3, content is bound to a device. Unlike in user binding, the content is bound to a device in which the content is stored. A device binding requirement is applied to content with copy-once CCI, which can be copied only once. If the content is bound to a device, only the device to which the content is bound must be permitted to reproduce the content according to the compliance rules.

Figure 4:
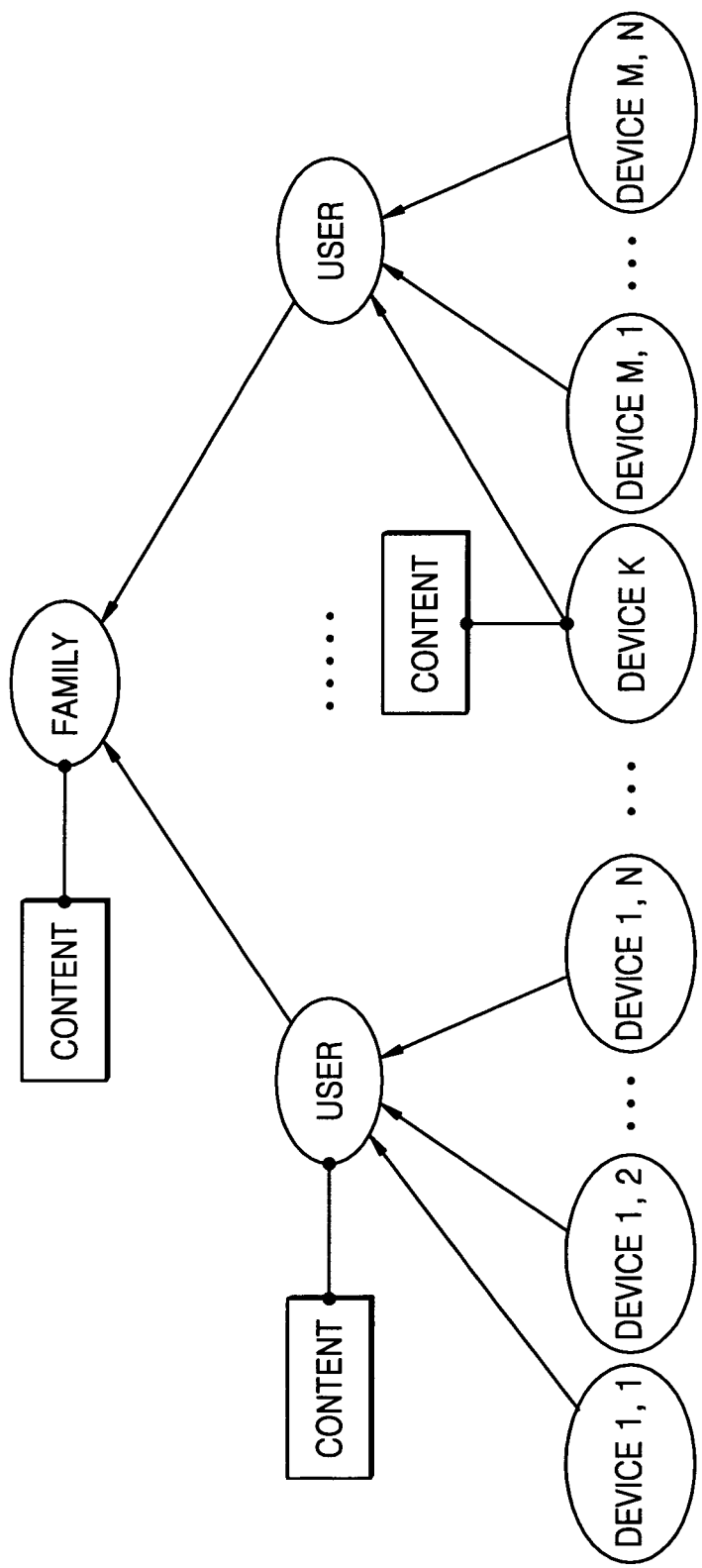
FIG. 4 is a diagram illustrating an interim node topology according to an exemplary embodiment of the present invention.

FIG. 4 illustrates an interim node topology according to an exemplary embodiment of the present invention. A node topology according to the exemplary embodiment is extensible to a node topology with a set of user nodes. Referring to FIG. 4, there is a family node on the top of user nodes. A device can be linked to at least one user node. That is, a device may join at least one domain.

Except where content must be bound to a device, the content may be bound to a set of users constituting a family. In other words, the content may be bound to either the family or the set of users belonging to the family. According to where content is bound, it can be used by the devices which have the link to the user node or the family node.

Figure 5:
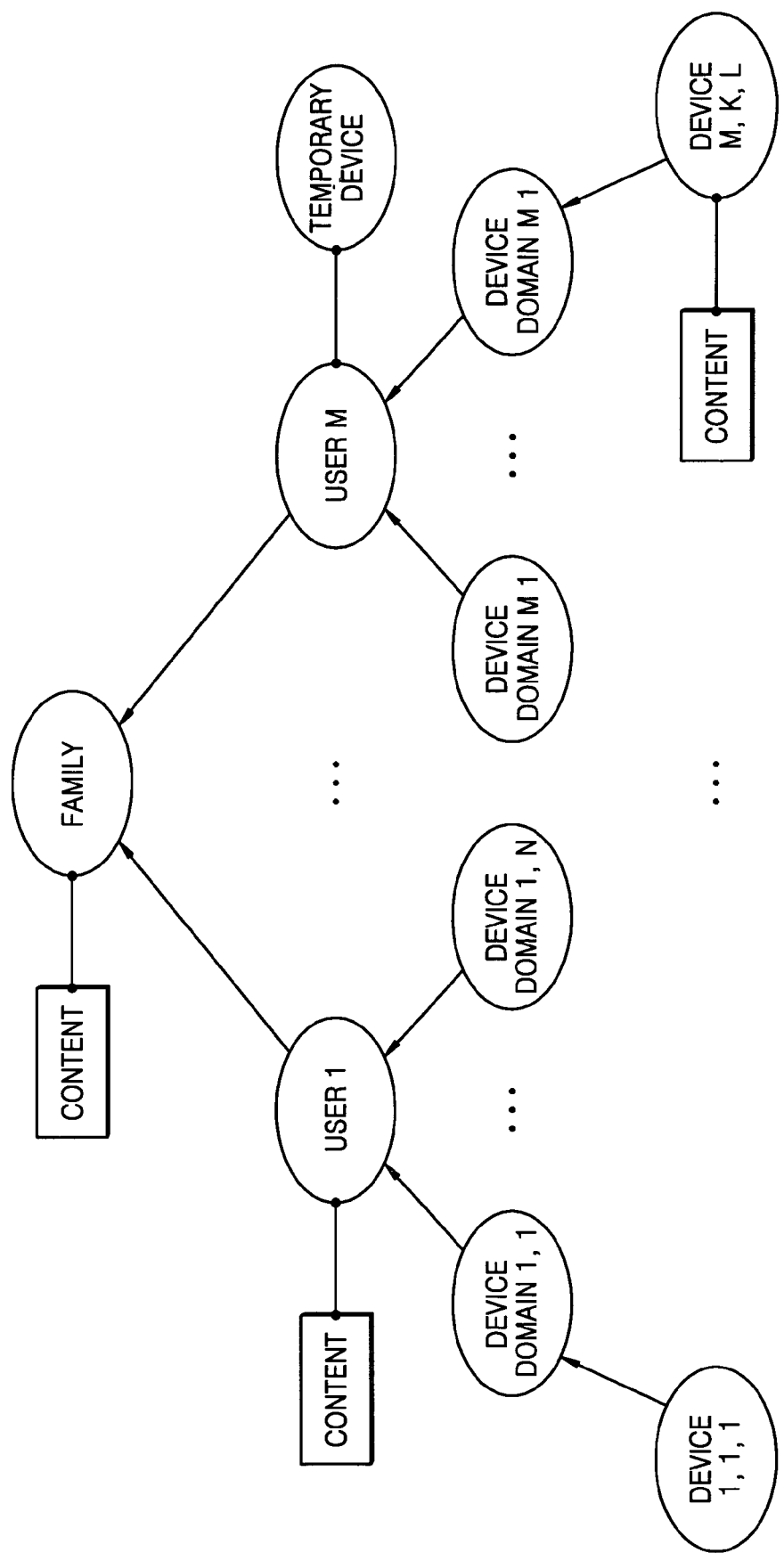
FIG. 5 is a diagram illustrating a final node topology according to an exemplary embodiment of the present invention.

FIG. 5 illustrates yet another node topology according to an exemplary embodiment of the present invention. Compared to FIGS. 2 through 4, the node topology depicted in FIG. 5 further uses concepts of a device domain and a temporary device.

Referring to FIG. 5, instead of being linked directly to a user node, devices are linked to a device domain node of the user node. A device may be linked to at least one device domain, and the number of device domains to which one device can be linked may be limited. Devices linked to a device domain can use the user's content.

For user's convenience, it is possible to allow a device to temporarily join a domain. To use a device that is not linked to its domain to reproduce its content, the user can temporarily include the device to the user's device domain using the user token because the user token contains all information required to link the device to the device domain. The user token may be anything available to identify the user and be obtained from a combination of user identification and password or using a smart card.

Figure 6:
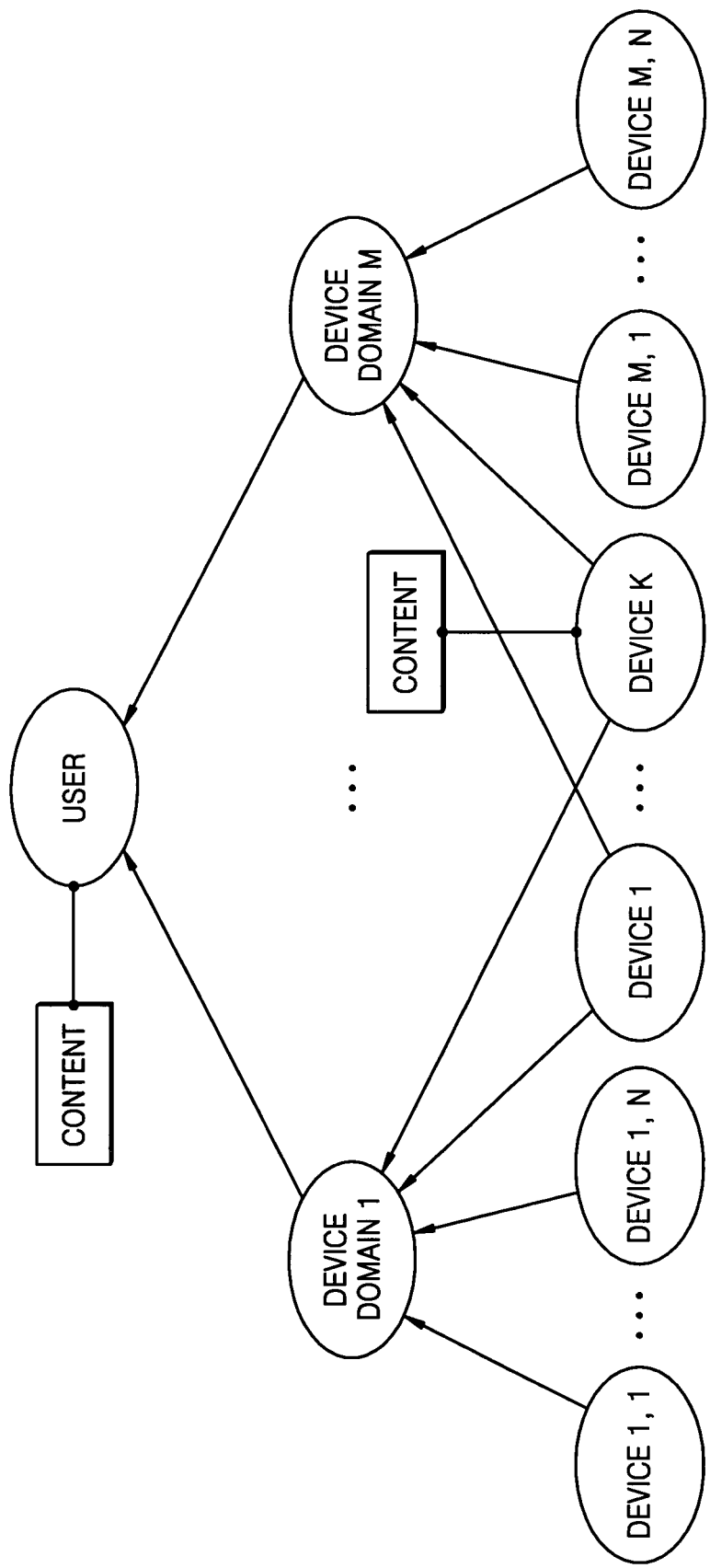
FIG. 6 is a diagram illustrating a modified, final node topology according to an exemplary embodiment of the present invention.

FIG. 6 illustrates a modified node topology according to an exemplary embodiment of the present invention. Compared to FIG. 5, FIG. 6 illustrates a federation of device domains. When content is bound to a user, the federation of device domains allows two or more device domains belonging to the user to use the content. That is, even if the content is bound to the user, when the device domains are in a federation, use of the content is permitted in at least two device domains.

As illustrated in FIG. 6, the user may hold at least one device domain. The number of device domains to be linked to the user may be limited. In this case, unless the user's device domains are in a federation, content bound to the user cannot be used. That is, the user-bound content is available to devices in each device domain of the user by federating the device domains.

Software or hardware provisioning required to perform the DRM according to an exemplary embodiment of the present invention will now be described.

According to cryptographic provisions, first, every device should have a pair of its own keys: a public key PUB_conf_dev and a private key PRIV_conf_dev. The pair of keys are embedded into the device during manufacture of the device and are never changed or disclosed to the outside. However, a home server may obtain the public key PUB_conf_dev from the device. Optionally, some domain devices may have their own secret key SEC_conf. Every domain device must be capable of performing an encryption process.

Second, every domain device should have a device key for revocation checking.

Third, as in a digital transmission content protection (DTCP), every domain device should have a device certificate issued by an authority. A public key PUB_auth of the authority must be stored in each domain device to verify the certificates of the other devices. The certificate is used to identify each entity.

According to the provisioning of middleware, the DRM, according to an exemplary embodiment of the present invention, defines its own middleware stack without depending on the existing middleware standards such as universal plug and play (UPNP). The middleware stack will later be described in greater detail.

In a hardware provisioning, the DRM according to an exemplary embodiment of the present invention, does not depend on network interfaces. Domain devices may support the existing network protocols such as the Ethernet, the USB, the IEEE1394, the Bluetooth, the IrDA, and the UWB. The only constraints to the DRM are that these protocols should support bi-directional communications. All domain devices should have the following components:

(i) Clock Counter: To authenticate other devices, all domain devices must support proximity checking. A method of proximity checking varies according to network protocols used between devices. In DRM specifications according to an exemplary embodiment of the present invention, a round trip time (RTT) is used for proximity checking. The RTT is a value obtained by measuring a current delay in a network. Since the RTT is obtained by timing a packet bounced off from a remote host, the clock counter is required to measure the RTT.

(ii) Implementation-Dependent Component: Components required are determined according to a purpose to be accomplished. Some domain devices may have implementation-dependent components. Also, components required vary according to an embodiment of the DRM.

Key management according to an exemplary embodiment of the present invention will now be described with reference to FIGS. 7 through 19.

As described above, domain management is indispensable to DRM, and key management is indispensable to domain management. A domain manager or a device in a home server performs key management.

Key management according to an exemplary embodiment of the present invention will now be described.

First, keys to be allocated to each node will be explained, and then, keys related to generation of a link will be explained. Also, protocols for protecting and delivering content keys will be described. In this exemplary embodiment, $E(x, y)$ denotes encryption of or the result of encrypting y using a key x.

Regarding a key allocated to each node, in general, a node represents a user, a device, or a group. Here, the group is defined as a family when the group is a user group, and defined as a device domain when the group is a device group. Each node (user node, device node, family node, device domain node, . . . ) in a domain has a pair of keys: a public confidentiality key PUB_conf and a private confidentiality key PRIV_conf. Alternatively, a node has a symmetrical confidentiality keys SEC_conf.

Regarding a domain key, for domain management, a domain manager in a home server generates various keys such as a sharing public key PUB_shar and a sharing private key PRIV_shar or selectively generates a sharing secret key SEC_shar. The sharing private key PRIV_shar or the sharing secret key SEC_shar is used as a domain key. Updating of a domain key will later be described in greater detail.

Regarding general key management related to generation of a link, a link represents the connectivity or relationship between two nodes. In generation of a link, two nodes simultaneously generate significant information for the DRM according to an exemplary embodiment of the present invention and entities corresponding to the nodes exchange the generated information. The information generated or exchanged is referred to as link information.

The link information is used in generating a content key or delivering a domain key to a device node. The details of the DRM are determined according to a method of generating the link information.

Figure 7:
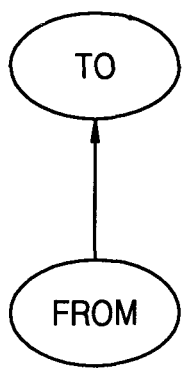
FIG. 7 is a diagram illustrating a link between two nodes according to an exemplary embodiment of the present invention.

FIG. 7 illustrates a link between two nodes according to an exemplary embodiment of the present invention.

A link is established between two nodes in two cases: when a 'FROM' node is a device node and when a "FROM" node is not a device node e.g., when the "FROM" node is a user node.

1. When a "FROM" node is a device node, link information LI is generated by encrypting a sharing private key PRIV_shar_to of a 'TO' node using a public confidentiality key PUB_conf_from of the 'FROM' node or by encrypting a sharing symmetrical key SEC_shar_to of the 'TO' node using the public confidentiality key PUB_conf_from of the 'FROM' node. In this case, generation of the link information LI is given by:

$$LI=E(PUB\_conf\_from, PRIV\_shar\_to), \text{ or}$$

$$LI=E(PUB\_conf\_from, SEC\_shar\_to) \quad (1)$$

2. When a 'FROM' node is not a device node, the link information LI is generated by encrypting a sharing private key PRIV_shar_to of the 'TO' node using a sharing public key PUB_shar_from of the 'FROM' node or by encrypting the sharing symmetrical key SEC_shar_to of the 'TO' node using a sharing public key PUB_shar_from of the 'FROM' node. In this case, generation of the link information LI is given by:

$$LI=E(PUB\_shar\_from, PRIV\_shar\_to) \text{ or}$$

$$LI=E(PUB\_conf\_from, SEC\_shar\_to) \quad (2)$$

Figure 8:
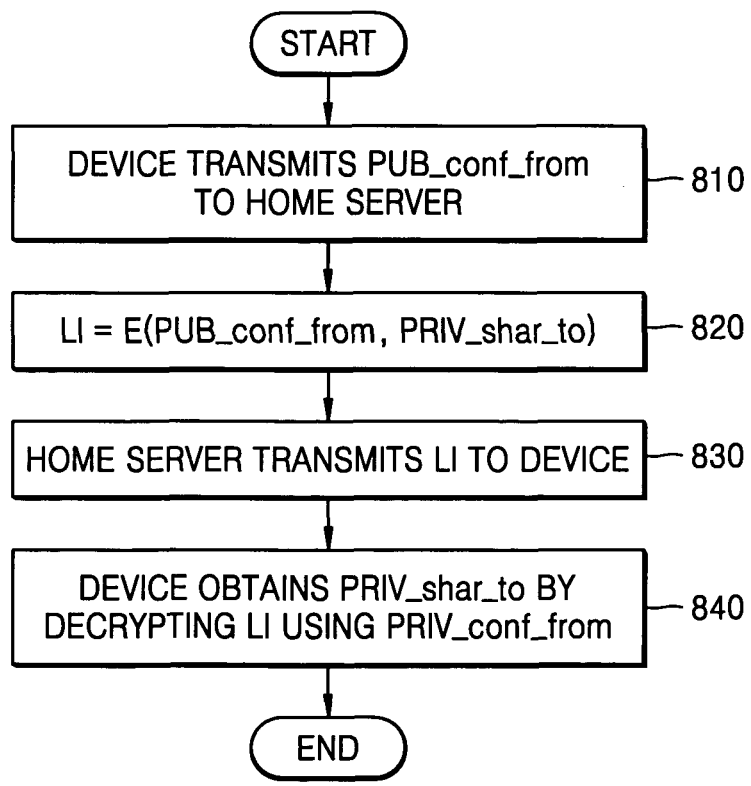
FIG. 8 is a flowchart illustrating a method of establishing a link between two nodes when a 'FROM' node is a device, according to an exemplary embodiment of the present invention.

FIG. 8 is a flowchart illustrating a method of establishing a link between two nodes when a 'FROM' node is a device, according to an exemplary embodiment of the present invention. Since the 'FROM' node is a device, Equation (1) is used in the method depicted in FIG. 8.

Referring to FIG. 8, the device transmits its public confidentiality key PUB_conf_from to a home server, particularly, to a domain manager in the home server (810).

Next, the home server generates link information LI by encrypting a sharing private key PRIV_shar_to of a 'TO' node using the public confidentiality key PUB_conf_from of the device received in operation 810 (820). In this case, the link information LI is given by:

$$LI=E(PUB\_conf\_from, PRIV\_shar\_to) \quad (3)$$

Next, the home server transmits the link information LI to the device (830).

Next, the device obtains a sharing private key PRIV_shar_to of the 'TO' node by decrypting the link information LI using its private confidentiality key PRIV_conf_from (840).

Alternatively, the sharing private key PRIV_shar_to of the 'TO' node may be replaced with a sharing secret key SEC_shar_to of the 'TO' node.

Figure 9:
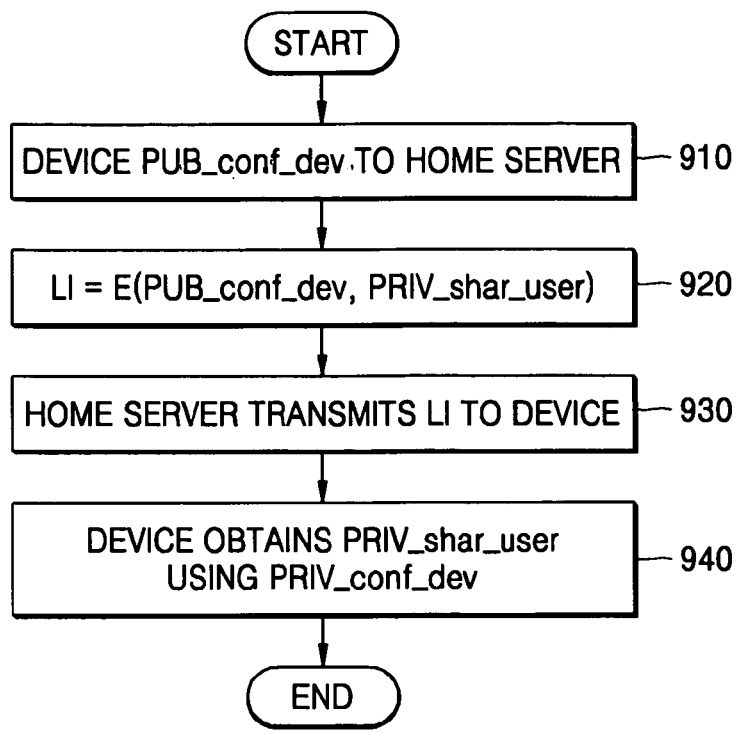
FIG. 9 is a flowchart illustrating a method of establishing a link between a device and a user according to an exemplary embodiment of the present invention.

FIG. 9 is a flowchart illustrating a method of establishing a link between a device and a user according to an exemplary embodiment of the present invention. Referring to FIG. 9, the device transmits its public confidentiality key PUB_conf_dev to a home server, particularly, to a domain manager in the home server (910).

Next, the home server generates link information LI by encrypting a sharing private key PRIV_shar_user of the user corresponding to a 'TO' node using a public confidentiality key PUB_conf_dev of the device received in operation 910 (920). In this case, the link information LI is given by:

$$LI=E(PUB\_conf\_dev, PRIV\_shar\_user) \quad (4)$$

Next, the home server transmits the link information LI to the device (930).

Next, the device obtains the sharing private key PRIV_shar_user of the user by decrypting the link information LI using a private confidentiality key PRIV_conf_dev of the device (940).

Alternatively, the sharing private key PRIV_shar_user of the user may be replaced with a sharing secret key SEC_shar_user of the user.

Figure 10:
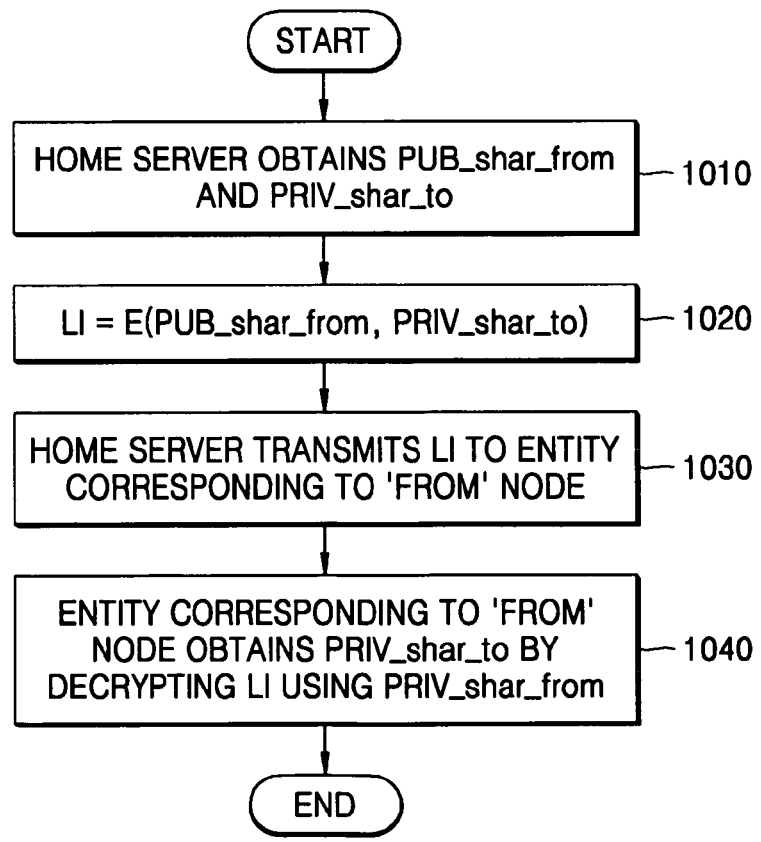
FIG. 10 is a flowchart illustrating a method of establishing a link between two nodes when a 'FROM' node is not a device, according to an exemplary embodiment of the present invention.

FIG. 10 is a flowchart illustrating a method of establishing a link between two nodes when a 'FROM' node is not a device, according to an exemplary embodiment of the present invention. Since the 'FROM' node is not a device, Equation (2) is used in the method depicted in FIG. 10.

Referring to FIG. 10, a home server obtains a sharing public key PUB_shar_from of an entity corresponding to the 'FROM' node and a sharing private key PRIV_shar_to of a 'TO' node (1010). Here, the entity corresponding to the 'FROM' node is one of a device domain, a user, and a user group. An entity corresponding to the 'TO' node is one of the user, the user group, and a family.

Next, the home server generates link information LI by encrypting the sharing private key PRIV_shar_to of the 'TO' node using the sharing public key PUB_shar_from of the entity corresponding to the 'FROM' node (1020). In this case, the link information LI is given by:

$$LI=E(PUB\_shar\_from, PRIV\_shar\_to) \quad (5)$$

Next, the home server transmits the link information LI to the entity corresponding to the 'FROM' node (1030).

Next, the entity corresponding to the 'FROM' node obtains the sharing private key PRIV_shar_to of the 'TO' node by decrypting the link information LI using its sharing private key PRIV_shar_from (1040).

Alternatively, the sharing private key PRIV_shar_to of the 'TO' node may be replaced with a sharing secret key SEC_shar_to of the 'TO' node.

Figure 11:
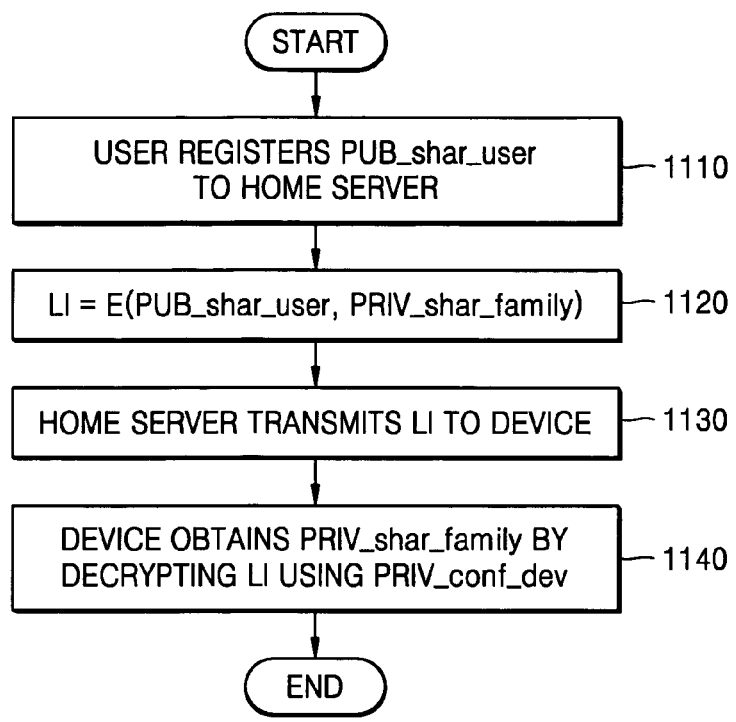
FIG. 11 is a flowchart illustrating a method of establishing a link between two nodes when a 'FROM' node is a user and a 'TO' node is a family according to an exemplary embodiment of the present invention.

FIG. 11 is a flowchart illustrating a method of establishing a link between two nodes when a 'FROM' node is a user and a 'TO' node is a family according to an exemplary embodiment of the present invention. Since the 'FROM' node is not a device, Equation (2) is used in the method depicted in FIG. 11.

Referring to FIG. 11, the user registers its sharing public key PUB_shar_user to a home server (1110), which may be performed when the user initializes the home server right after purchasing the home server. A pair of keys including a public key and a private key may be issued by an authority and transmitted to the home server.

Next, the home server generates link information LI by encrypting a sharing private key PRIV_shar_family of a family corresponding to the 'TO' node using the sharing public key PUB_shar_user of the user registered in operation 1110 (1120). The link information LI is given by:

$$LI=E(PUB\_shar\_user, PRIV\_shar\_family) \quad (6)$$

Next, the home server transmits the link information LI to the device (1130).

Next, the device obtains the sharing private key PRIV_shar_family of the family by decrypting the link information LI using its private confidentiality key PRIV_conf_dev (1140).

Alternatively, the sharing private key PRIV_shar_family of the family may be replaced with a sharing secret key SEC_shar_family of the family.

Figure 12:
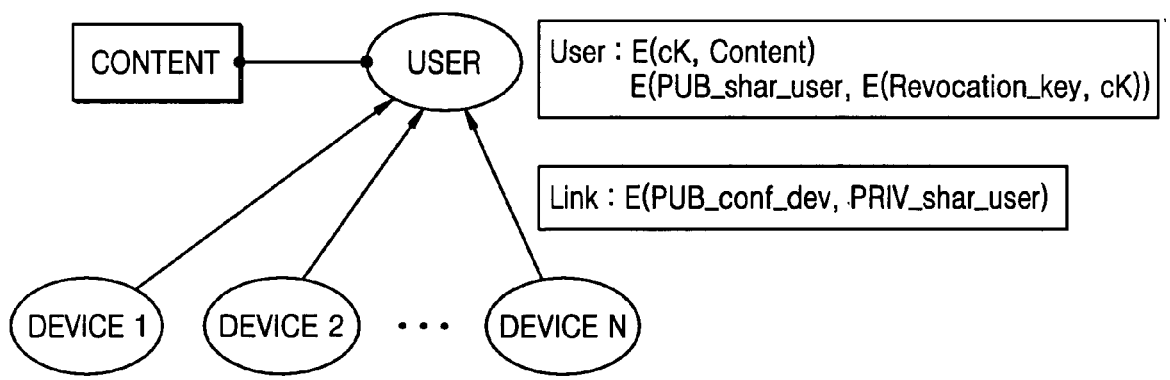
FIG. 12 is a diagram illustrating key management in a domain with user-bound content according to an exemplary embodiment of the present invention.

FIG. 12 is a diagram illustrating the concept of key management in a domain with user-bound content according to an exemplary embodiment of the present invention. Referring to FIG. 12, the content is encrypted using a content key cK. The content key cK is encrypted twice i.e., it is first encrypted using a revocation key Revocation_key and then encrypted using a sharing public key PUB_shar_user of a user again. Therefore, the encrypted content key ECK=E(PUB_shar_user, E(Revocation_key, cK)).

Since the content key cK is encrypted using the revocation key Revocation_key, the content can only be used by devices that are not revoked in a user domain. A device linked to a user node is capable of decrypting the content by extracting the content key cK using the link information and the revocation key Revocation_key.

Alternatively, a sharing symmetrical key SEC_shar_user of the user may be used as a domain key, instead of the sharing public key PUB_shar_user of the user.

Also, since the content key cK is further encrypted using the sharing public key PUB_shar_user of the user i.e., the domain key, the content key cK can only be used by devices that are acknowledged as members of the domain.

Hereinafter, key management of binding content to a user according to an exemplary embodiment of the present invention will be described.

Figure 13:
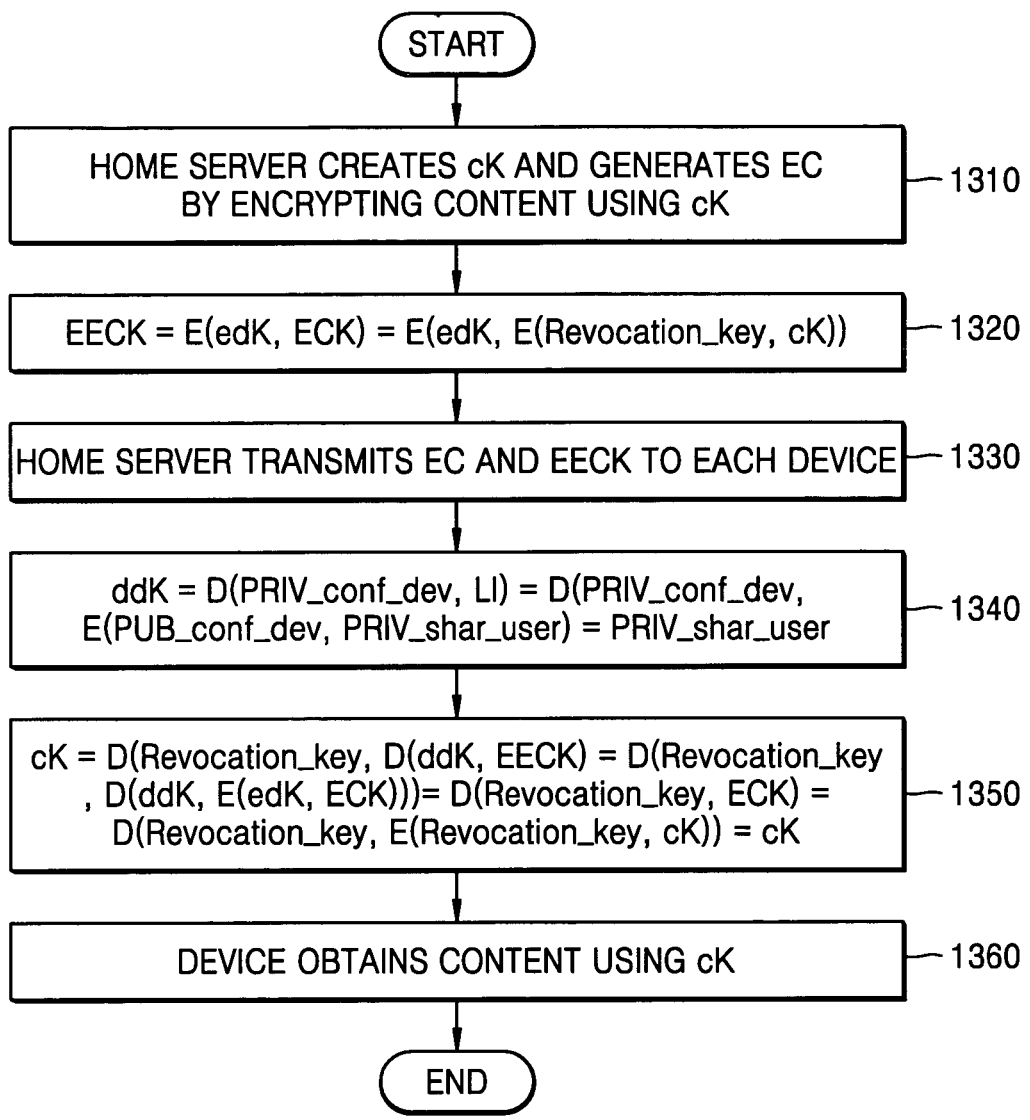
FIG. 13 is a flowchart illustrating key management of user-bound content according to an exemplary embodiment of the present invention.

FIG. 13 is a flowchart illustrating key management of user-bound content according to an exemplary embodiment of the present invention. Referring to FIG. 13, a home server, particularly, a domain manager in the home server, generates a content key cK for each content, and obtains encrypted content EC by encrypting the content using the content key cK (1310). The content key cK may be obtained by generating random numbers.

Next, the home server generates a first encrypted content key ECK by encrypting the content key cK using a revocation key Revocation_key, and generates a second encrypted content key EECK by encrypting the first encrypted content key ECK using an encryption domain key edK (1320). In this case, the second encrypted content key EECK is given by:

$$EECK = E(edK, ECK) = E(edK, E(\text{Revocation\_key}, cK)) \quad (7),$$

wherein a sharing public key PUB_shar_user of the user is used as the encryption domain key edK for user binding.

The revocation key Revocation_key is selected from device keys that are not allocated to devices to be revoked, through broadcast encryption.

Next, the home server transmits the encrypted content EC and the second encrypted content key EECK to each device (1330).

Next, each device obtains a decryption domain key ddK using a private confidentiality key PRIV_conf_dev of the device and link information LI (1340). In this case, the decryption domain key ddK is given by:

$$\begin{aligned} ddK &= D(\text{PRIV\_conf\_dev}, LI) \quad (8) \\ &= D(\text{PRIV\_conf\_dev}, E(\text{PUB\_conf\_dev}, \text{PRIV\_shar\_user})) \\ &= \text{PRIV\_shar\_user} \end{aligned}$$

wherein the link information LI=E(PUB_conf_dev, PRIV_shar_user). The link information LI is obtained by the device during establishment of a link between two nodes. The link information LI is given by Equation (1), and the link may be established during registration of the device to the home server.

Next, the device acquires the content key cK by decrypting the second encrypted content key EECK which is received in operation 1330 using the decryption domain key ddK and the revocation key Revocation_key (1350).

Specifically, the device reproduces the first encrypted content key ECK=E(Revocation_key, cK) by decrypting the second encrypted content key EECK using the decryption domain key ddK=PRIV_shar_user obtained in operation 1340, and obtains the content key cK by decrypting the first encrypted content key ECK using the revocation key Revocation_key. In this case, the content key cK is given by:

$$\begin{aligned} cK &= D(\text{Revocation\_key}, D(ddK, EECK)) \quad (9) \\ &= D(\text{Revocation\_key}, D(ddK, E(edK, ECK))) \\ &= D(\text{Revocation\_key}, ECK) \\ &= D(\text{Revocation\_key}, E(\text{Revocation\_key}, cK)) \\ &= cK, \end{aligned}$$

Only devices that have not been revoked can acquire the revocation key Revocation_key. The revocation key Revocation_key is allocated to a device by allocating a device key to the device through broadcast encryption and sending the device information for identifying the revocation key Revocation_key used to encrypt the content key cK when transmitting the first encrypted content key ECK to the device. The allocation of the revocation key Revocation_key will be described in greater detail with reference to FIG. 14.

Alternatively, the encryption domain key edK and the decryption domain key ddK=sharing secret key SEC_shar_user. That is, symmetrical keys are used in this case.

Next, the device obtains the content by decrypting the encrypted content EC received in operation 1330 using the content key cK obtained in operation 1350 (1360).

According to this exemplary embodiment, only devices linked to the user can use the link information LI. That is, only the devices linked to the user can use the content. Accordingly, the content is bound to the user.

Figure 14:
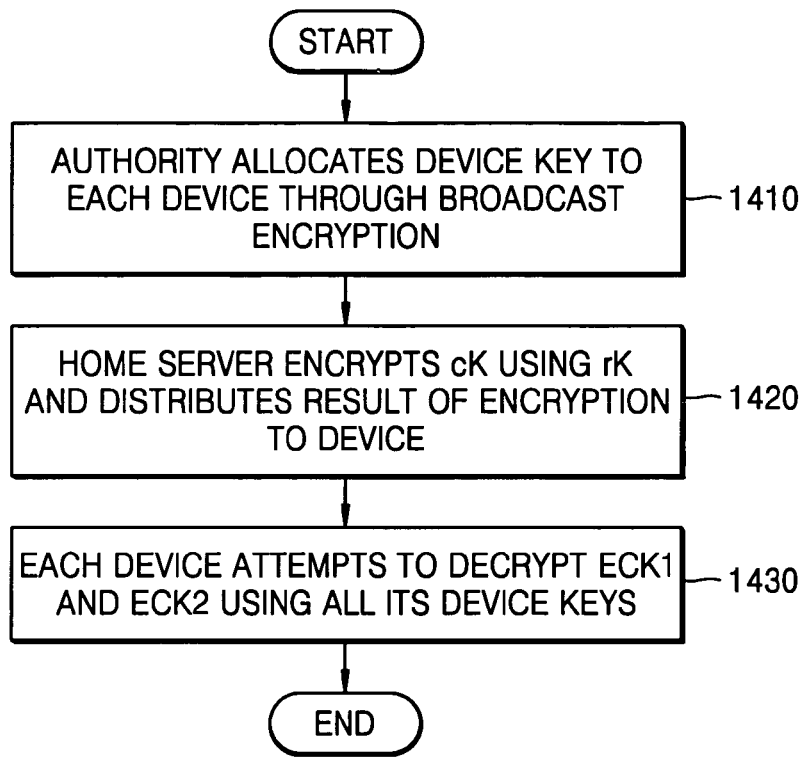
FIG. 14 is a flowchart illustrating a method of allocating a device key to a device using a revocation key according to an exemplary embodiment of the present invention.
Figure 15:
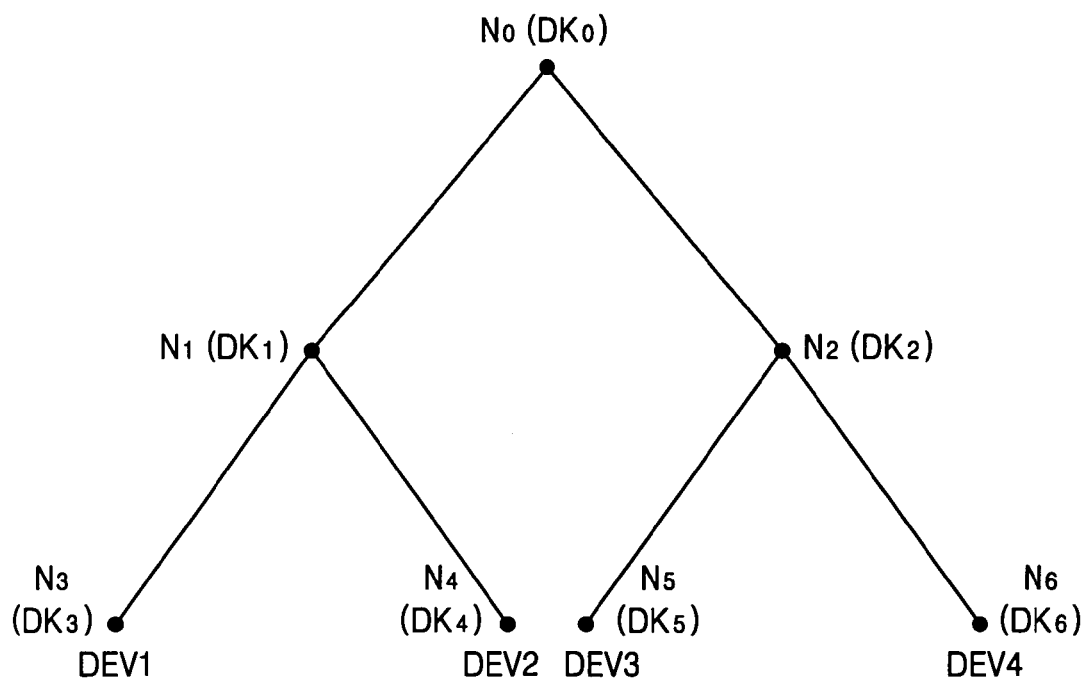
FIG. 15 is a diagram illustrating that a home server allocates a device key to each device according to an exemplary embodiment of the present invention.

FIG. 14 is a flowchart illustrating a method of allocating device keys to devices using a revocation key according to an exemplary embodiment of the present invention. Referring to FIG. 14, an authority allocates a device key to each device through broadcast encryption (1410). Allocation of a device key to each device according to an exemplary embodiment is illustrated in FIG. 15. In other words, a device key allocated to each device is embedded into the device during a manufacture process. A device key is also allocated to a device acting as a home server.

FIG. 15 is a diagram illustrating a home server allocating a device key to each device according to an exemplary embodiment of the present invention. Referring to FIG. 15, nodes $N_0$ through $N_6$ are hierarchically arranged. The node No is an upper node, the nodes $N_1$ and $N_2$ are middle nodes, and the nodes $N_3$, $N_4$, $N_5$, and $N_6$ are lower nodes. Device keys $DK_0$ through $DK_6$ are allocated to the nodes $N_0$ through $N_6$, respectively. Also, devices DEV1, DEV2, DEV3, and DEV4 are allocated to the lower nodes $N_3$, $N_4$, $N_5$, and $N_6$, respectively.

Then, the device keys $DK_0$ through $DK_6$ allocated to all the upper nodes are allocated to the devices DEV1, DEV2, DEV3, and DEV4. For instance, the device DEV1 is given the device keys $DK_0$, $DK_1$, and $DK_3$, and the device DEV4 is given the device keys $DK_0$, $DK_2$, and $DK_6$. The device keys $DK_0$ through $DK_6$ are allocated to the devices DEV1 through DEV4 by an authority and embedded into the devices during a manufacture process.

Returning to FIG. 14, the home server encrypts a content key cK using a revocation key i.e., a device key which is allocated to devices that have not been revoked, and distributes the result of encryption to each device (1420).

It is assumed that the home server stores revocation information RI specifying devices that have been revoked. That is, the revocation information RI is stored in the home server during a manufacture process.

The revocation information RI can be updated by obtaining new revocation information either from a device connected to the home server or an optical disk inserted into the home server. Thus, whenever a device to be revoked is detected, the authority recommends that a device manufacturer store latest revocation information in devices or optical disks that are put on the market after the detection.

A case where the device DEV4, illustrated in FIG. 15, has been revoked will now be described. In this case, encrypted content key ECK is given by:

$$ECK=ECK1\|ECK2=E(DK1,cK)\|E(DK5,cK) \quad (10),$$

wherein ECK1 and ECK2 denote encrypted content key blocks.

There are various ways of representing the revocation information RI. For instance, the revocation information RI is represented with the numbers of nodes indicating device keys that have not been revoked.

If the revocation information RI that the device DEV4 has been revoked is represented with (1,5), that is, RI=(1, 5), the home server encrypts the content key cK using the device keys $DK_1$, $DK_3$, $DK_4$, and $DK_5$.

Next, each device attempts to decrypt the encrypted content key blocks ECK1 and ECK2 using all its device keys (1430). If a device decrypts at least one of the encrypted content key blocks ECK1 and ECK2, the device can acquire the content key cK. For instance, since the devices DEV1 and DEV2 have the device key $DK_1$, they can obtain the content key cK by decrypting the encrypted content key block ECK1 using the device key $DK_1$. Since the device DEV3 has the device key $DK_5$, it can obtain the content key cK by decrypting the encrypted content key block ECK2 using the device key $DK_5$. However, since the device DEV4 does not have any one of the device keys $DK_1$ and $DK_5$, it cannot decrypt all the encrypted content key blocks ECK1 and ECK2 and therefore cannot obtain the content key cK.

Updating of a domain key will now be described. When a specific device leaves a domain, the domain key must be updated to prevent the device that left the domain from using content imported into the domain. Thus, after the device leaves the domain, the home server encrypts the existing content key again and regenerates link information using the new domain key.

Figure 16:
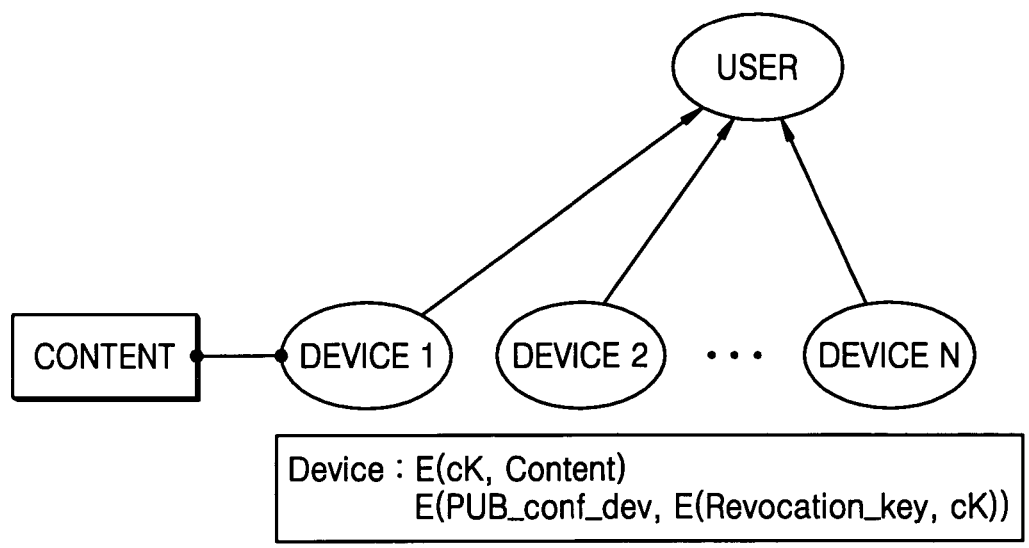
FIG. 16 is a conceptual diagram illustrating key management in a domain with device-bound content according to an exemplary embodiment of the present invention.

FIG. 16 is a diagram illustrating key management in a domain with device-bound content according to an exemplary embodiment of the present invention. Content is encrypted using a content key cK, and the content key cK is encrypted using a revocation key and a public confidentiality key of a device. That is, the content key cK=E(PUB_conf_dev, E(Revocation_key,cK)). Alternatively, when the device has a symmetrical confidentiality key SEC_conf_dev, a public confidentiality key PUB_conf_dev of the device may be replaced with the symmetrical confidentiality key SEC_conf_dev.

Hereinafter, key management of binding content to a device according to an exemplary embodiment of the present invention will be described.

Figure 17:
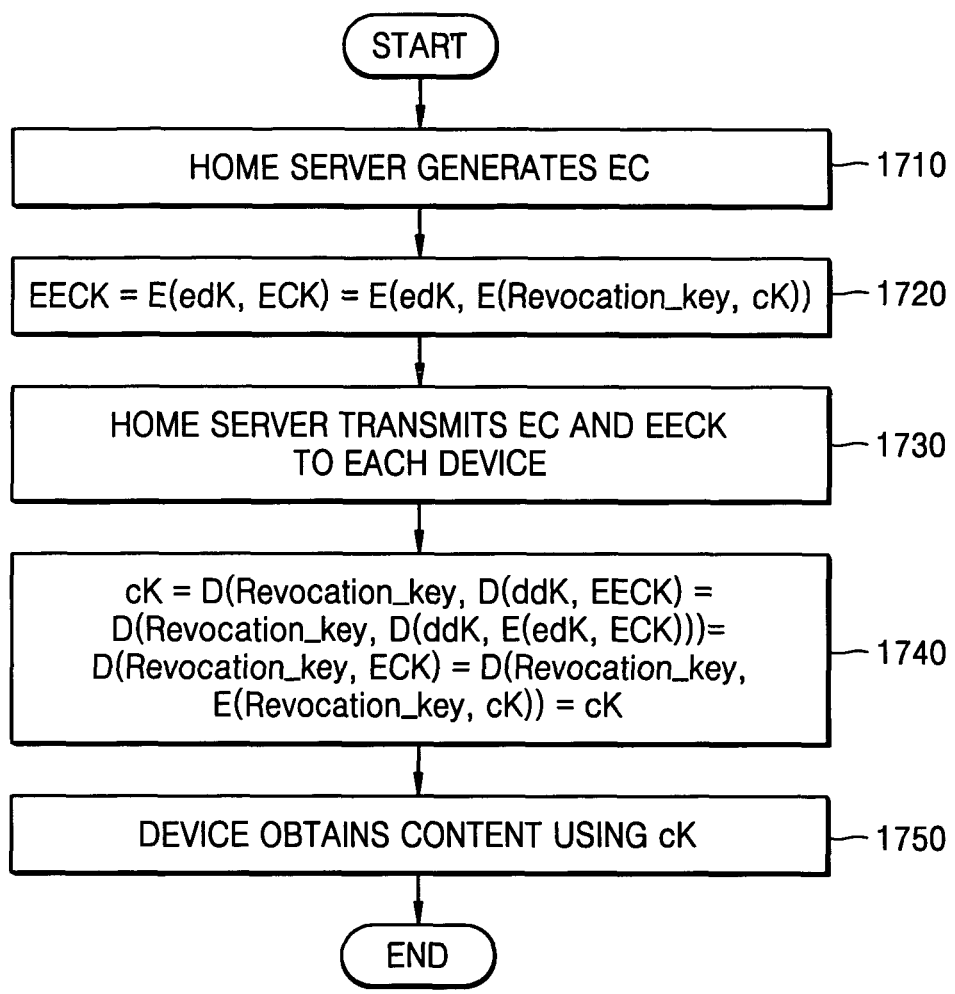
FIG. 17 is a flowchart of key management of device-bound content according to an exemplary embodiment of the present invention.

FIG. 17 is a flowchart illustrating key management of device-bound content according to an exemplary embodiment of the present invention. Referring to FIG. 17, a home server particularly, a domain manager in the home server, obtains encrypted content EC by generating a content key cK for each content and encrypting the content using the content key cK (1710). The content key cK may be generated using random numbers.

Next, the home server generates a first encrypted content key ECK by encrypting the content key cK using a revocation key Revocation_key, and a second encrypted content key EECK by encrypting the first encrypted content key ECK using an encryption domain key edK (1720). In this case, the second encrypted content key EECK is given by:

$$EECK=E(edK, ECK)=E(edK, E(\text{Revocation\_key}, cK)) \quad (11),$$

For device binding, a public confidentiality key PUB_conf_dev of a device is used as an encryption domain key edK.

The revocation key Revocation_key is selected from device keys allocated to devices that have not been revoked, through broadcast encryption.

Next, the home server transmits the encrypted content EC and the second encrypted content key EECK to each device (1730).

Next, the device obtains the content key cK by decrypting the second encrypted content key EECK received in operation 1730, using a decryption domain key ddK and the revocation key Revocation_key (1740).

That is, the device reproduces the first encrypted content key ECK=E(Revocation_key, cK) by decrypting the second encrypted content key EECK using its decryption domain key ddK=PRIV_conf_dev, and obtains the content key cK by decrypting the first encrypted content key ECK using the revocation key Revocation_key. The content key cK is given by:

$$\begin{aligned}
cK &= D(\text{Revocation\_key}, D(ddK, EECK)) \quad (12) \\
&= D(\text{Revocation\_key}, D(ddK, E(edK, ECK))) \\
&= D(\text{Revocation\_key}, ECK) \\
&= D(\text{Revocation\_key}, E(\text{Revocation\_key}, cK))
\end{aligned}$$

Similarly, in the methods of FIGS. 13 and 14, the revocation key Revocation_key is obtainable by only devices that are not revoked, and allocation of the devices includes allocating a device key to each device through broadcast encryption and transmitting the device information identifying a revocation key used in encrypting the content key cK to the devices when the encrypted content key ECK is sent to the devices.

Alternatively, a secret confidentiality key SEC_conf_dev of the device may be used as the encryption domain key edK and the decryption domain key ddK. That is, symmetrical keys may be used.

Next, the device obtains the content by decrypting the encrypted content EC received in operation 1730 using the content key cK obtained in operation 1740 (1750).

According to this exemplary embodiment, since only the device has the private confidentiality key PRIV_conf_dev of the device, the content is available to the device only. Accordingly, the content is bound to the device.

Figure 18:
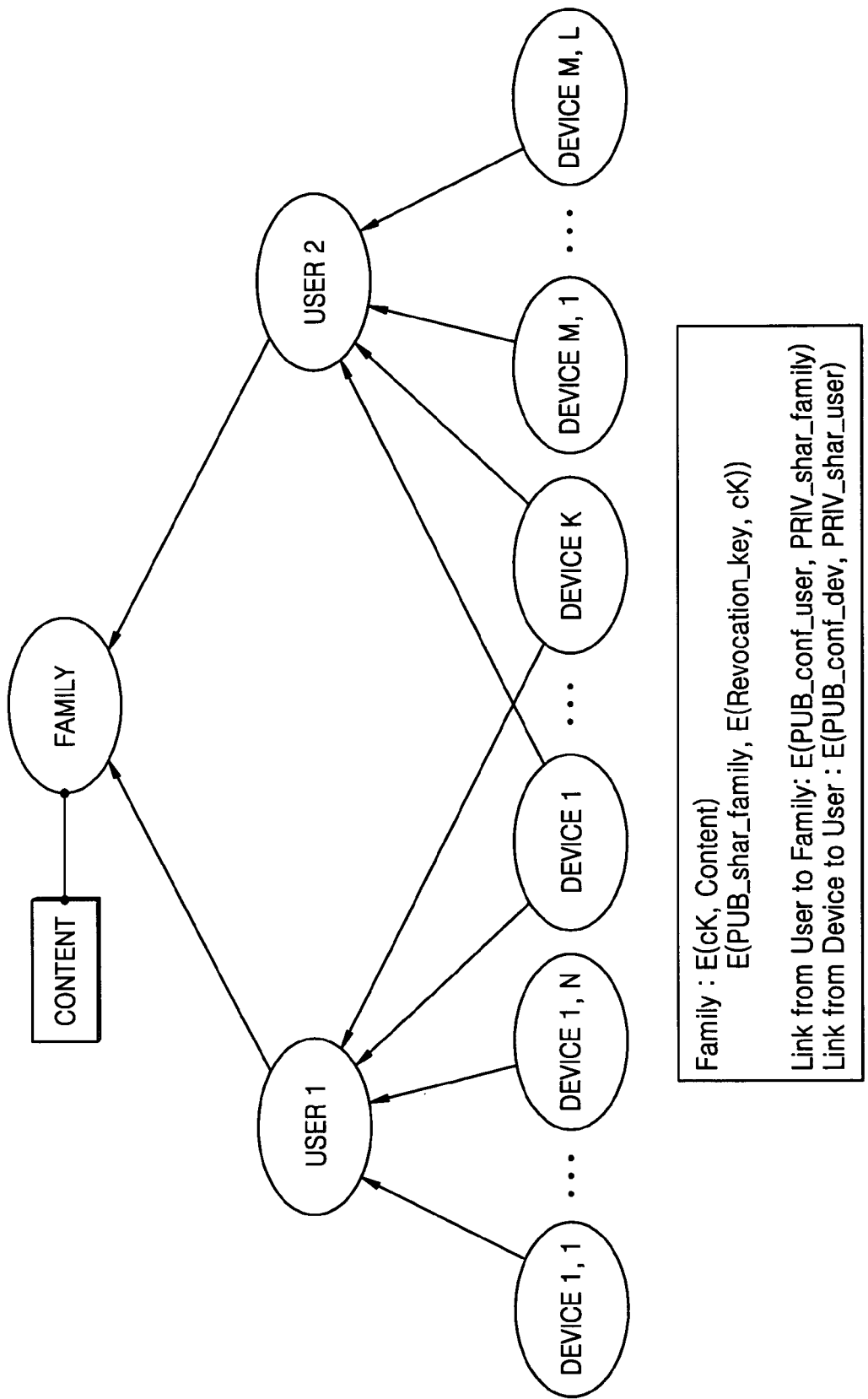
FIG. 18 is a conceptual diagram illustrating key management in a domain with family-bound content according to an exemplary embodiment of the present invention.

FIG. 18 is a diagram illustrating key management in a domain with family-bound content according to an exemplary embodiment of the present invention. The key management illustrated in FIG. 18 is extended from the key management for content bound to a user, and therefore is somewhat analogous to the key management illustrated in FIG. 12. Accordingly, further detailed description is omitted.

Figure 19:
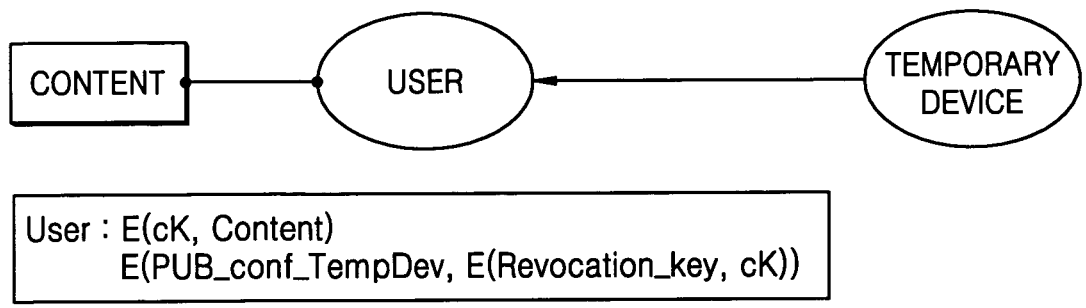
FIG. 19 is a conceptual diagram illustrating key management when a temporary device exists according to an exemplary embodiment of the present invention.

FIG. 19 is a diagram illustrating key management when a temporary device exists according to an exemplary embodiment of the present invention. When a specific device is temporarily used, key management of device-bound content is applied to the DRM. In this case, a public confidentiality key PUB_conf_Tempdev of the temporary device is used as an encryption domain key edK. That is, a content key cK is encrypted to E(PUB_conf_Tempdev, E(Revocation_key, cK)).

Registration or deregistration according to an exemplary embodiment of the present invention will now be described with reference to FIGS. 20 through 26. Registration includes user registration when generating and resetting a domain, and device registration when adding a device to the existing domain. Hereinafter, a component capable of managing a domain is referred to as a domain manager. In general, the domain manager is realized in a home server.

A device, such as a set-top box (STB), a personal video recorder (PVR), and a personal computer (PC), may include a domain manager, and the domain manager makes various keys required for domain management using a key algorithm according to a key management system described with reference to FIGS. 6 through 10.

Registration according to an exemplary embodiment of the present invention will now be described.

Figure 20:
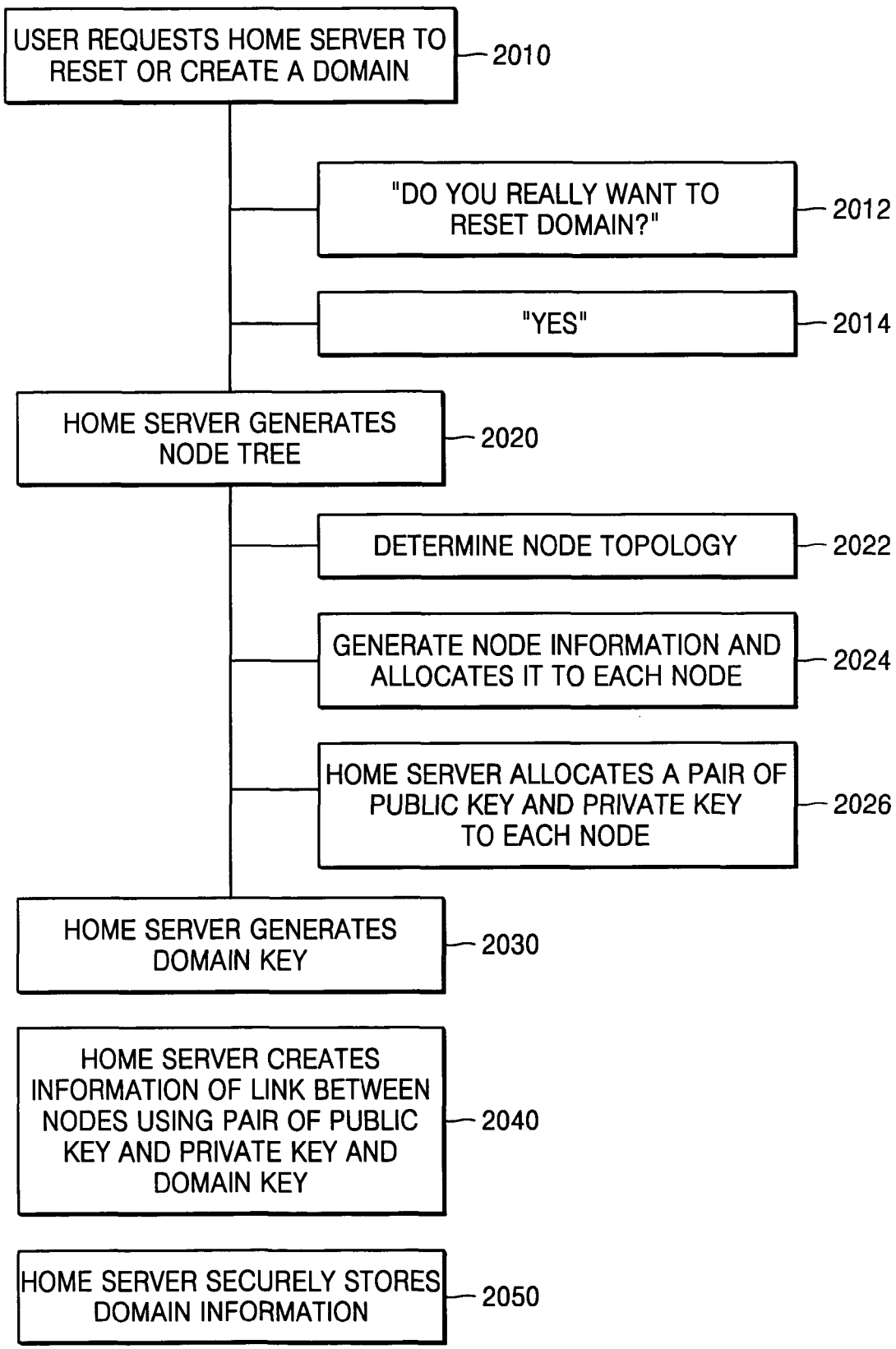
FIG. 20 is a flowchart illustrating user registration according to an exemplary embodiment of the present invention.

FIG. 20 is a flowchart illustrating user registration according to an exemplary embodiment of the present invention. User registration is performed by resetting or creating a domain, allowing the domain manager to generate a user node key based on user information. A device node for a specific device may become a member of the domain by acquiring link information regarding a user node.

In the method of FIG. 20, the STB may act as a home server. A domain manager with a user interface may be realized in the STB. The domain manager is requested to reset or create a domain.

Specifically, referring to FIG. 20, a user requests the home server to reset (or create) a domain via a user interface menu of the home server, for example (2010).

The method of FIG. 20 may further include operations 2012 and 2014 in which the home server confirms whether the user desires to reset or generate a domain.

Next, for user confirmation, the home server presents the user with a popup message "Do you really want to reset a domain?" (2012).

Next, the user answers "yes" by pressing, for example, a button of a remote controller (2014).

Next, the home server creates a node tree (2020). The topology and number of a node are determined by a user. The node tree is created through operations 2022 and 2024.

That is, the home server determines the topology of the node (2022). The user selects one of an initial topology, an interim topology, and a final topology as the topology of the node.

Next, the home server creates information regarding each node and allocates it to each node (2024). That is, the home server determines information regarding the name of each node and an entity corresponding to each node (device, user group, or user).

Next, the home server allocates a pair of keys: a public key and a private key, to each node (entity) (2026). Alternatively, the home server allocates a secret key to each node.

Next, the home server creates a domain key required to share content in the domain (2030). That is, when a domain is created, the home server creates a new domain key. When a domain is reset, the home server cancels the existing domain key or changes the version of the domain, and creates a new domain key. The domain key may be obtained using random numbers or based on information input by the user. A domain key is created for each node tree.

Next, the home server generates link information between two nodes using the pair of keys and the domain key allocated to each entity (2040). Alternatively, the home server may generate the link information using the secret key and the domain key given to each entity. A method of generating link information i.e., establishing a link between two nodes, varies according to a node topology as described with reference to FIGS. 7 through 11.

Next, the home server securely stores information regarding the domain, i.e., domain information, in itself (2050). The domain information may include node information, the link information, the domain key, the version of the domain key, and domain name. The term "securely" indicates a state in which the stored information cannot be accessed from the outside of the home server.

Figure 21:
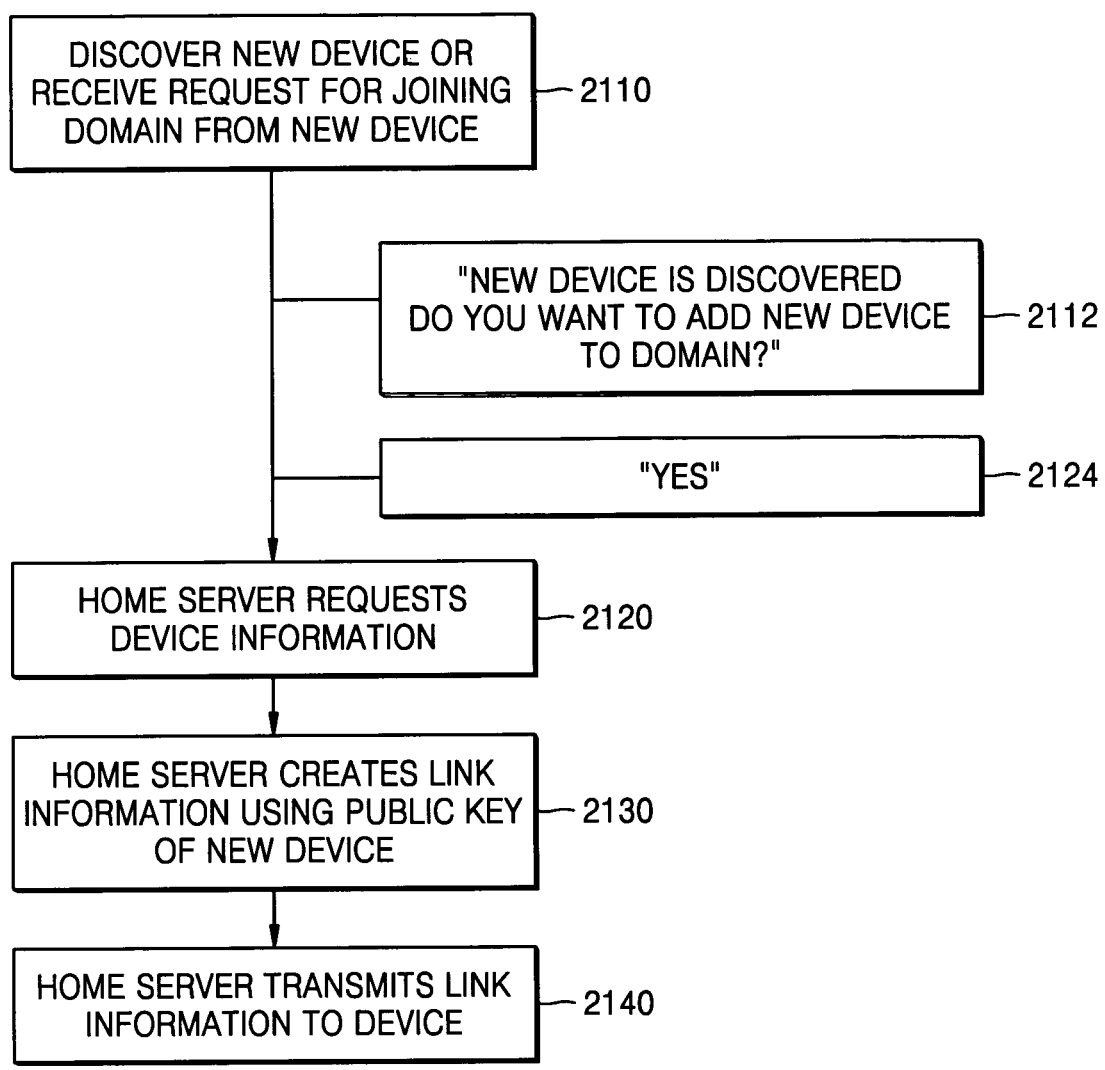
FIG. 21 is a flowchart illustrating device registration according to an exemplary embodiment of the present invention.

FIG. 21 is a flowchart of device registration according to an exemplary embodiment of the present invention. Device registration is required when a new device desires to join a specific domain. Device registration includes device authentication and exchange of information required for device registration. When a device is registered to a node tree of a home server, the device can acquire a domain key and a content key.

For instance, a device registered to an initial topology receives link information between a device node corresponding to the device in a node tree and a user node to acquire a domain key for sharing content in a domain, and obtains a content key using the link information and the domain key. An exemplary method of acquiring a domain key and a content key has been described with reference to FIGS. 13 through 19.

Device authentication is performed through proximity checking and revocation checking. When a new device passes proximity checking satisfactorily, a domain manager collects information, e.g., an identifier and a public key of the device, which is required to register the device to the domain. Next, the domain manager determines whether the device has been revoked. If the device is not revoked, the domain manager stores information regarding the device, establishes a link between the device and itself, and transmits a domain key and link information to the device for sharing content. Lastly, the device receives the link information and the domain key, and becomes a member of the domain.

Device registration is performed in the following operations.

Referring to FIG. 21, a home server starts device registration when it detects a new device connected to the home server or it receives a request for joining a domain from a device (2110).

Alternatively, operation 2110 may include operations 2112 and 2124. In detail, for user confirmation, the home server presents a user with a popup message such as "A new device is detected. Do you want to add it to the domain?" (2112). Next, the user answers "yes" by pressing a button of a remote controller, for example (2114).

Next, the home server requests the device to provide its device information (2120). The device information includes a public key and an identifier of the device.

Next, the home server creates link information between the device and a user node by encrypting a domain key using the public key of the device (2130).

Next, the home server transmits the link information to the device (2140).

Device authentication will now be described. Authentication is required between a home server and a device and between two devices.

Here, authentication is performed to determine whether a device is authenticated according to a DRM system. That is, authentication according to the present invention includes proximity checking, determining whether a device has been revoked, or determining whether the device is a member of a specific domain. Since a device can be identified through a certificate issued by an authority and device identification is also applied to an exemplary embodiment of the present invention as in the prior art, detailed description of device identification will be omitted.

Figure 22:
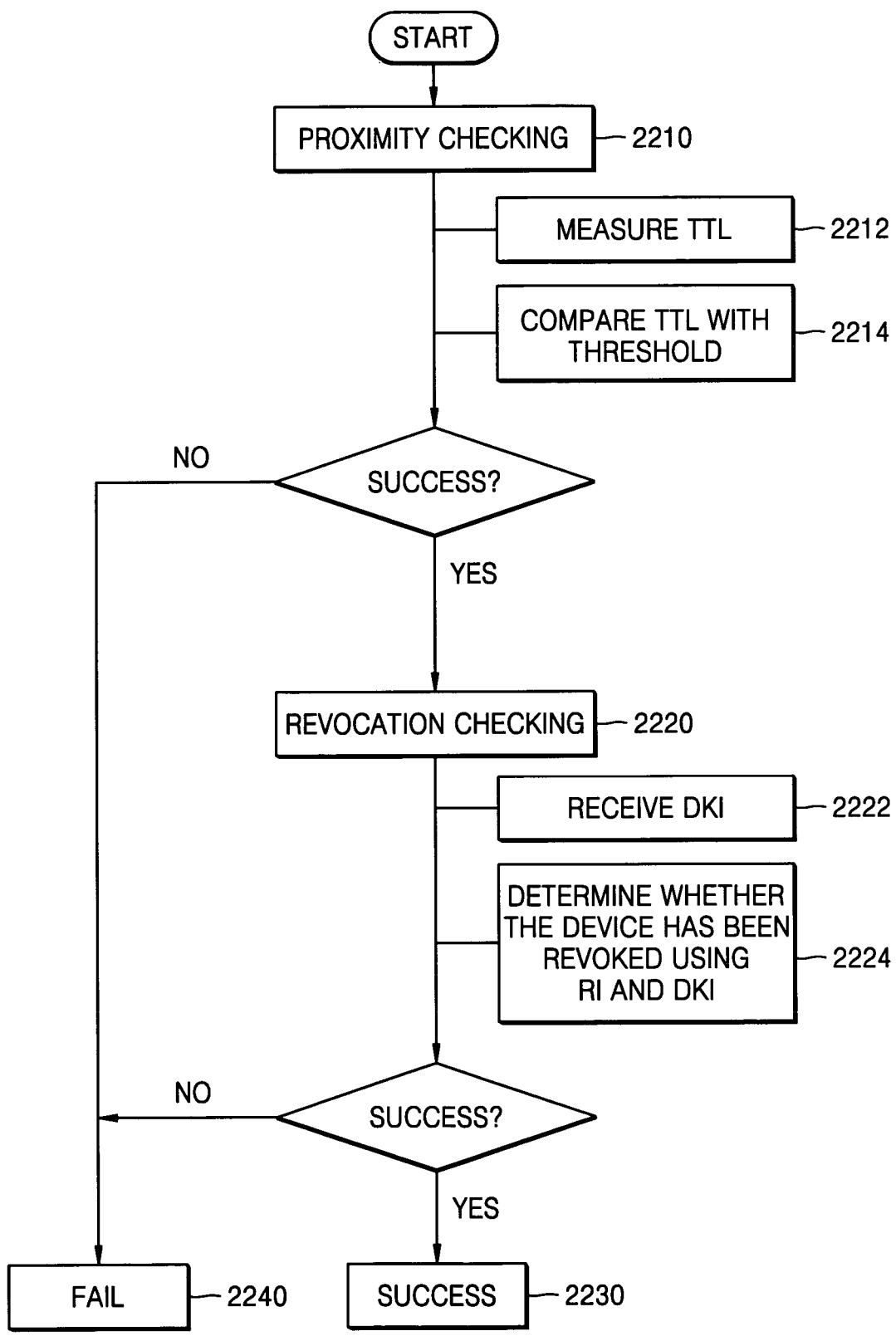
FIG. 22 is a flowchart illustrating authentication between a home server and a device according to an exemplary embodiment of the present invention.

FIG. 22 is a flowchart illustrating authentication between a home server and a device according to an exemplary embodiment of the present invention. Referring to FIG. 22, when a device joins a specific domain, the home server performs proximity checking on the device (2210). Operation 2210 includes operations 2212 and 2214. When the device passes the proximity checking successfully, operation 2220 is performed. Otherwise, operation 2230 is performed.

The home server transmits a test packet to the device to measure a time-to-live (TTL) time between the device and the home server (2212). Alternatively, the TTL may be replaced with a round trip time (RTT).

Next, the home server compares a predetermined threshold with the TTL time measured in operation 2212 to determine whether the device can pass proximity checking (2214). If the TTL time is less than the predetermined threshold, the device is considered as passing proximity checking. The proximity threshold is determined within an allowable range of distributing content e.g., a physical scope of a home network. Since the purpose of proximity checking is to mainly prevent content from being distributed without a limit, the range of the predetermined proximity threshold does not significantly affect authentication. For instance, it is possible to prevent unlimited distribution of content by limiting the physical scope of the home network to that of an apartment complex. For instance, the proximity threshold RTT may be determined to be 7 ms.

Next, the home server determines whether the device has been revoked using revocation information RI, and device identification information (DII) identifying the device (2220).

The DII may be a device identifier (DI) or a device key identifier (DKI).

If the DII is the DI, the revocation information RI is a list of the identifiers of devices that have been revoked i.e., a certified revocation list (CRL). In this case, the home server receives the DI of the device from the device, and determines whether the device is revoked by checking whether the received DI is listed in its CRL.

If the DII is the DKI, the home server determines whether the device has been revoked, using a device key distribution method used in broadcast encryption such as HBES. When the DII is the DKI, operation 2220 includes operations 2222 and 2224.

Next, the home server receives the DKI from the device (2222). The DKI is information identifying a device key of the device. The DKI may be the number of the device key or the device key. For instance, the DKI of the device DEV4 illustrated in FIG. 15 is 6 or the device key $DK_6$.

Next, the home server determines whether the device has been revoked, using the revocation information RI and the DKI (2224).

It is assumed that whether the device DEV4 of FIG. 15 has been revoked is determined when device keys such as that shown in FIG. 15 is distributed and the revocation information RI stored in the home server is (1,5). In this case, the home server determines that the device DEV4 is not revoked when the received DKI is information identifying device keys subordinate to the nodes $N_1$ and $N_5$, and determined that the device DEV4 is revoked otherwise.

That is, the home server considers only devices that send the home server the DKI specifying all the device keys subordinate to the nodes $N_1$ and $N_5$ as not being revoked, according to a device key distribution architecture such as that shown in FIG. 15.

Operation 2230 is performed when revocation checking is completed successfully. Otherwise, operation 2240 is performed.

The home server determines that device authentication is successfully completed (2230).

Alternatively, the home server determines that device authentication fails and as such the device authentication is completed (2240).

Figure 23:
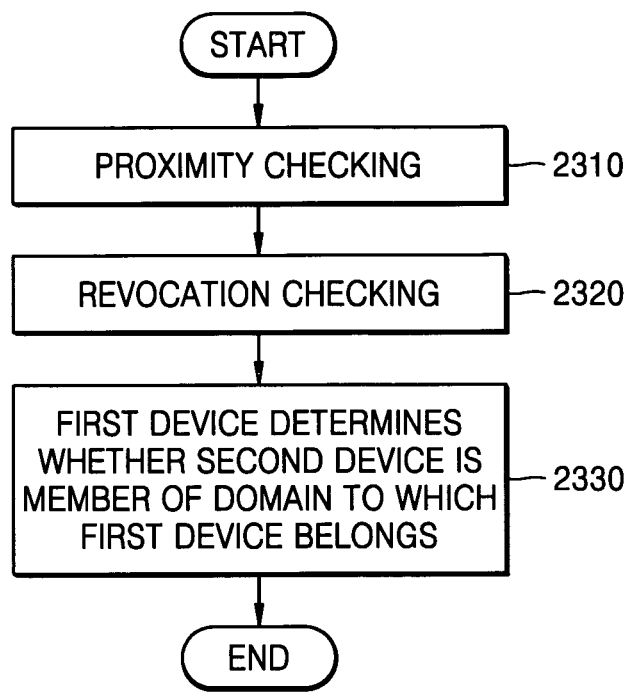
FIG. 23 is a flowchart illustrating authentication between two devices according to an exemplary embodiment of the present invention.

FIG. 23 is a flowchart illustrating authentication between two devices according to an exemplary embodiment of the present invention. In this embodiment, it is assumed that two devices e.g., a source device and a sink device, have already joined a domain. The source device is a device with domain-bound content, and the sink device is a device that desires to use content and requests the source device to provide the content.

The source device and the sink device must authenticate each other before transmission of content. Authentication is performed through proximity checking, revocation checking, and checking members of the domain. A method in which a first device authenticates a second device is performed in operations 2310 through 2330.

Referring to FIG. 23, the first device performs proximity checking on the second device (2310). Exemplary proximity checking has been described with reference to operation 2210 of FIG. 22.

Next, the first device performs revocation checking on the second device (2320). Revocation checking in operation 2320 is analogous to the revocation checking in operation 2220 of FIG. 22 except that the first device should have the revocation information. The revocation information can be acquired from a home server or an authority.

Next, the first device determines whether the second device is a member of a domain to which the first device belongs (2330). The first device may determine whether the second device is a member of the domain by checking whether a domain key of the second device is the same as that of the first device.

Hereinafter, registration and deregistration of a device will be described according to an exemplary, non-limiting embodiment of the present invention.

Figure 24A:
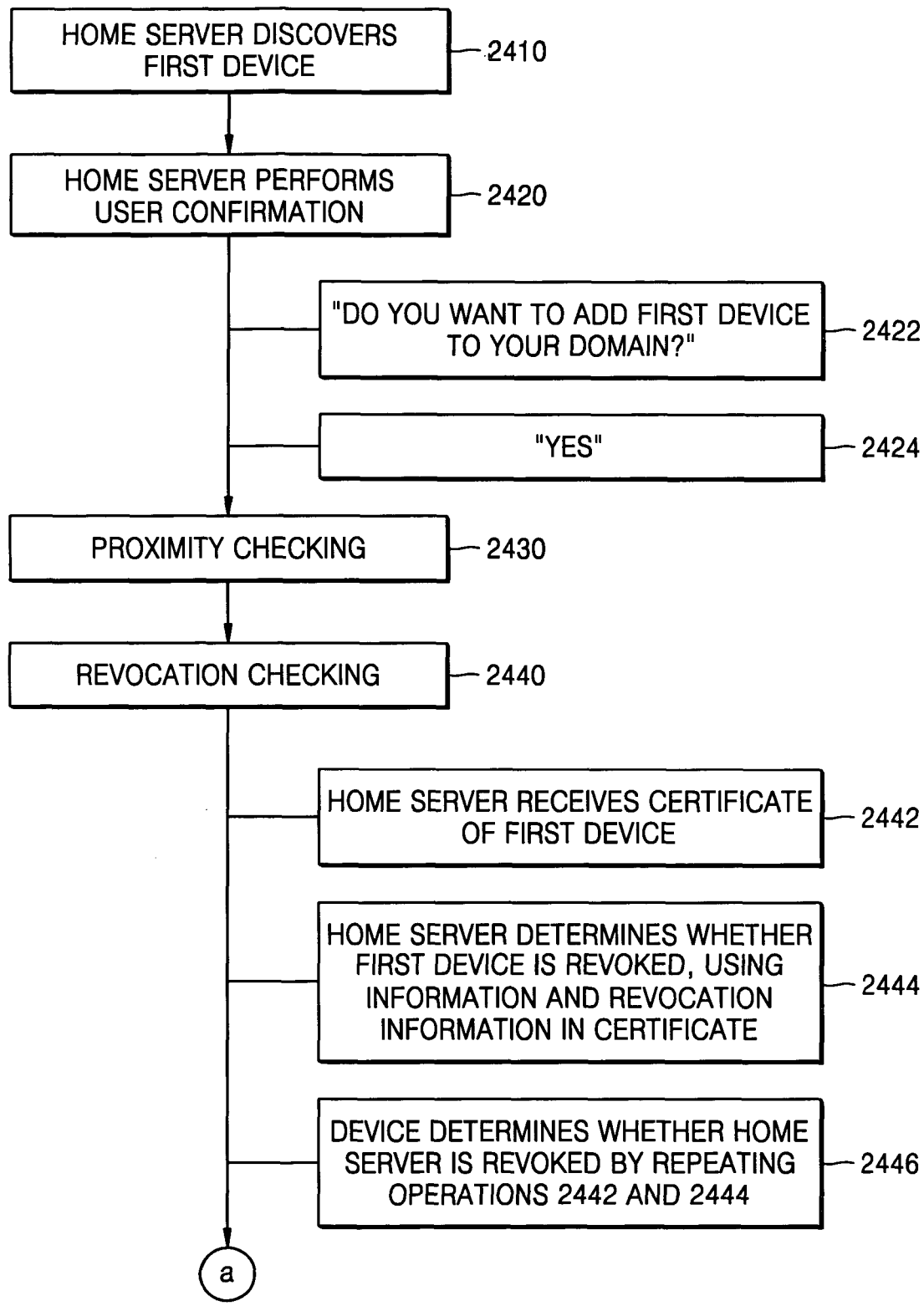
FIGS. 24A and 24B illustrate a flowchart of device registration according to an exemplary embodiment of the present invention.
Figure 24B:
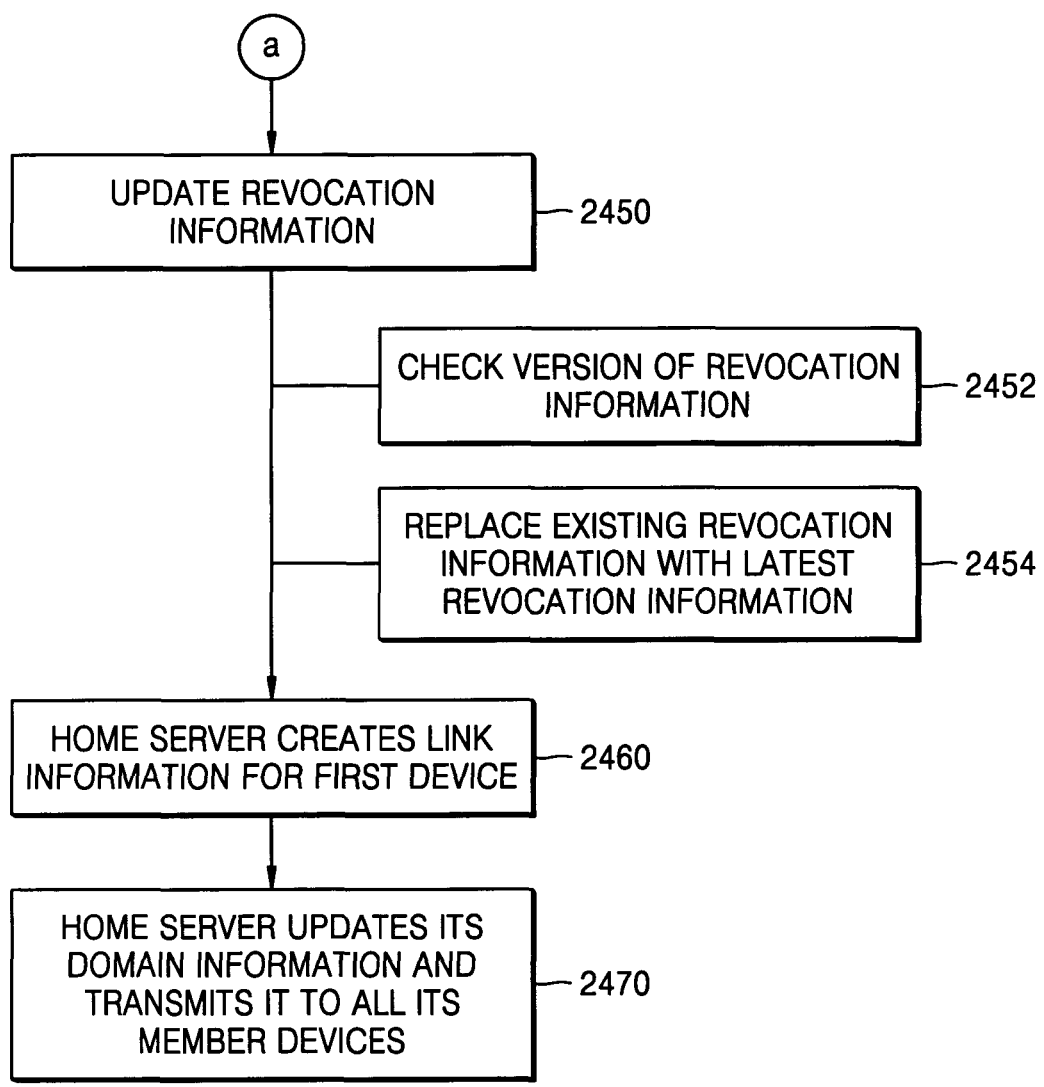

FIGS. 24A and 24B illustrate a flowchart of device registration according to an exemplary embodiment of the present invention. A user may allow a device to join the user's domain through registration. Registration will now be described in greater detail with reference to FIGS. 24A and 24B.

First, a home server detects a first device physically connected to the home server (2410).

Next, the home server performs user confirmation (2420). Operation 2420 is optional and includes operations 2422 and 2424.

The home server presents the user with a popup message "Do you want to allow the first device to join the domain to which you belong?" (2422).

Next, the user answers "yes" (2424), registration is continued. Otherwise, registration is discontinued.

Next, the home server performs proximity checking between the home server and the first device (2430). Proximity checking has been described above. When the home server and the first device pass proximity checking, registration is continued. Otherwise, registration is terminated.

Next, the home server and the first device 1 perform revocation checking for each other (2440). Operation 2440 includes operations 2442 through 2446.

Next, the home server receives a certificate of the first device (2442). The certificate includes an identifier and a public confidentiality key of the first device and a signature executed by an authority.

Next, the home server determines whether the first device is revoked, using information included in the certificate and revocation information (2444). Revocation checking has been described above. The authenticity of the identifier of the first device is guaranteed by the signature of the authority.

Next, the first device performs revocation checking on the home server by performing operations 2442 and 2444 (2446).

If one of the first device and the home server is determined to be revoked, registration ends.

Next, when both the first device and the home server are not revoked, they examine their respective revocation information and update them if required (2450).

To update the revocation information, the version of the revocation information is checked (2452). The version of the revocation information may be indicated in the revocation information.

Next, the revocation information is replaced with the latest revocation information (2454).

Alternatively, updating of the revocation information may require the registration of a device joining the existing domain to be canceled, which will be later described with reference to FIGS. 25 and 26.

Next, the home server creates link information for the first device (2460).

An Exemplary method of creating the link information has been described above. The link information for a link between a user node and a device node may include an encrypted domain key=E(PUB_conf_dev1, PRIV_shar_user) or E(PUB_conf_dev1, SEC_shar_user), the encrypted domain key being obtained by a sharing private key of the user using a public confidentiality key (or a sharing symmetrical key) of the first device.

Alternatively, the public confidentiality key of the first device may be replaced with the sharing symmetrical key.

Next, the home server updates domain information stored therein and transmits it to all member devices of the domain (2470).

The domain information includes link information, detailed information of the domain, and information regarding members of the domain.

The detailed information of the domain specifies a node tree, the name and version of the domain, and a domain key. The node tree denotes information regarding elements of the domain, that is, information regarding a link between nodes.

The information regarding members of the domain is divided into family information, user group information, user information, and device information, and includes the identifier and a public key (or a symmetrical key) of an entity corresponding to each member. If a member is a user or a device, the information regarding members of the domain includes user information and device information in an initial topology.

The user information specifies the name and age of the user, a pair of a public confidentiality key and a private confidentiality key of the user (or symmetrical keys), and a pair of a sharing public key and a sharing private key of the device (or symmetrical keys).

The device information includes an identifier and a public key (a symmetrical key) of the device. A private key of the device is available to only the device.

Figure 26:
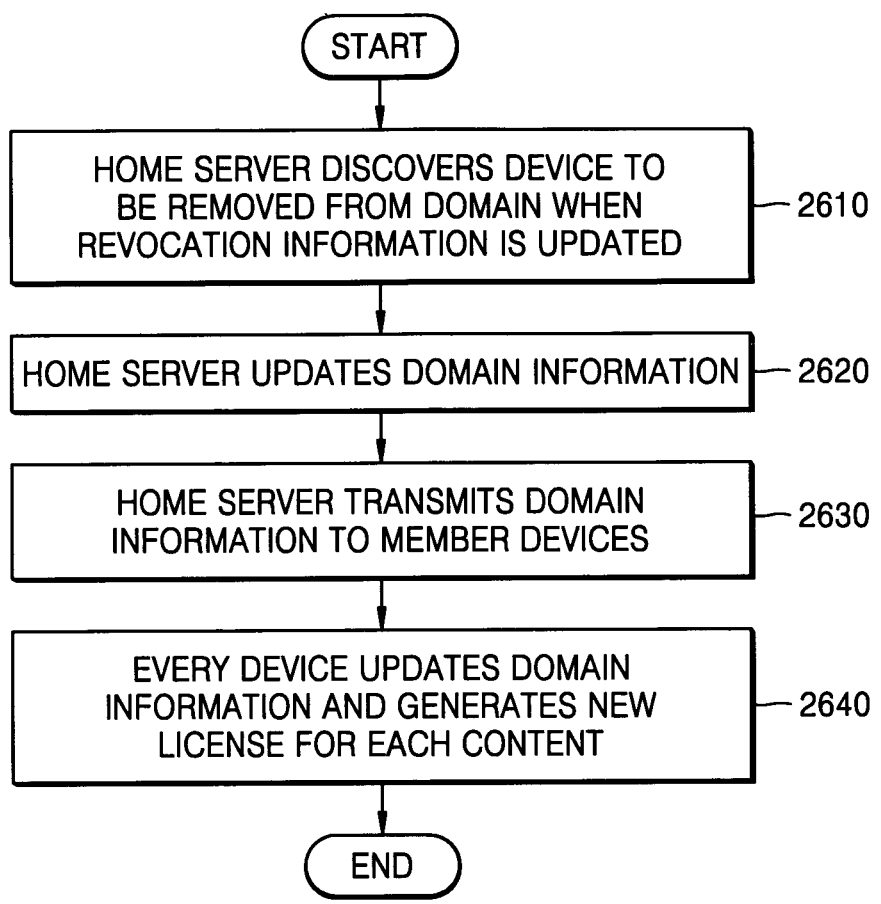
FIG. 26 is a flowchart illustrating deregistration initiated by a home server according to an exemplary embodiment of the present invention.

FIGS. 25 and 26 illustrate a flowchart of deregistration of a device according to an exemplary embodiment of the present invention. Deregistration is performed for two cases: where a user initiates deregistration, and where deregistration is automatically initiated during domain management of a home server. In the former case, the user deregisters a specific device at his/her own discretion, and in the latter case, deregistration is performed automatically when the device is determined to be revoked after revocation information is updated.

In detail, FIG. 25 is a flowchart of deregistration initiated by a user according to an exemplary embodiment of the present invention. Referring to FIG. 25, the user requests a home server to deregister a first device using a user interface of the home server (2510).

Next, the home server creates a new domain key, and creates new link information using the new domain key (2520).

Next, the home server updates information regarding a domain by canceling device information regarding the first device and changing information to be changed when the first device leaves the domain (2530).

Next, the home server transmits the updated information to all of the remaining devices joining the domain (2540).

Next, each of the remaining devices updates information regarding the domain stored in it using the information received in operation 2540, and creates a new license for each content (2550). Updating of the new license includes encrypting a content key again using a new domain key included in the information received in operation 2540.

FIG. 26 is a flowchart of deregistration initiated by a home server according to an exemplary embodiment of the present invention. Referring to FIG. 26, the home server detects a device to be removed from a domain when revocation information is updated (2610).

Next, the home server updates information regarding a domain by creating a new domain key and creating new link information using the new domain key (2620).

Next, the home server transmits the information to member devices of the domain (2630).

Each device updates information regarding the domain stored in it using the information received in operation 2630, and creates a new license for each content (2640). Updating of the new license includes encrypting a content key again using a new domain key included in the information received in operation 2630.

Hereinafter, a security architecture according to an exemplary embodiment of the present invention will be described. The security architecture provides blocks for protecting content from various security dangers. The security dangers may be an unauthorized access to the content, illegal copying of the content, and redistribution of valuable content. The blocks are embedded into a home server and a device.

Figure 27:
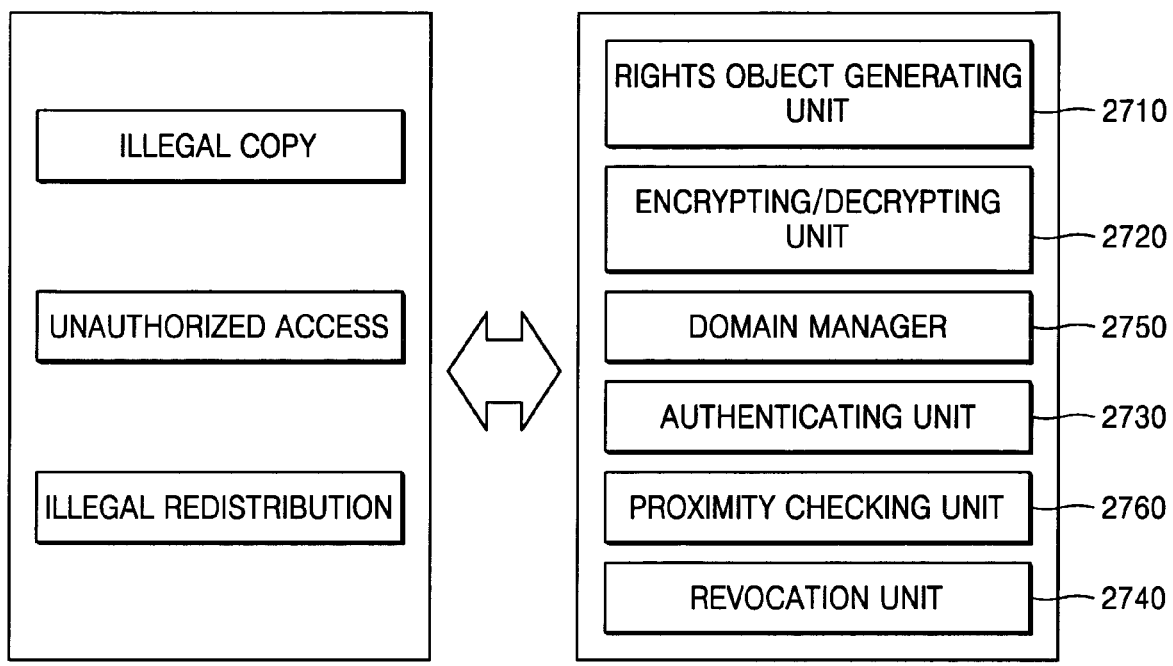
FIG. 27 is a block diagram illustrating a basic security architecture for protecting content according to an exemplary embodiment of the present invention.

FIG. 27 is a block diagram illustrating basic security architecture for protecting content from security threats according to an exemplary embodiment of the present invention. Referring to FIG. 27, a rights object generating unit 2710 and an encrypting/decrypting unit 2720 protect content from an unauthorized access and enforce the content to be used according to usage rules.

The rights object generating unit 2710 generates a rights object based on CCI/BF and user input. A DRM system does not permit access to the content without a rights object.

The rights object includes content usage rules (URs) regarding usage prohibitions, and binding information (BI) describing a subject by which the content is bound and an object to which the content is bound. The rights object is uniquely connected to the content using an encryption key. The rights object is also referred to as a license.

The rights object may be created into an XML document, and be encoded and included in a binary object.

The encrypting/decrypting unit 2720 performs various encrypting and decrypting operations in a home server and a device. For instance, the encrypting/decrypting unit 2720 encrypts and decrypts the content using a content key, and encrypts and decrypts the content key using a revocation key and a domain key.

An authenticating unit 2730 authenticates identification of a device according to a basic authentication mechanism. The basic authentication mechanism is performed using authentication information e.g., a certificate issued by an authority, or a pair of keys including a public key and a private key. Authentication verifies whether an object has rights to the content. All devices compatible in a DRM system according to an exemplary embodiment of the present invention have data related to encryption e.g., a public key and a private key, a certificate, and a secret key. A source device authenticates a target device using the authentication information or information extracted from the authentication information before delivering the rights object and content.

A revocation unit 2740 determines whether a device is revoked using revocation information and device information transmitted from the device, and updates the revocation information.

In a DRM system, when the private key or the secret key is infringed, the revocation unit 2740 prevents a revoked object from accessing the rights object and the content. Also, the revocation unit 2740 allows devices compatible in the DRM system to keep up the latest revocation information, and synchronizes the revocation information between the compatible devices.

A domain manager 2750 creates, changes, and cancels a domain. In such operations, link establishment described with reference to FIGS. 8 through 11, key management described with reference to FIGS. 12 through 19, and registration and deregistration described with reference to FIGS. 20 through 26 are performed. A domain is an important concept for preventing an unauthorized object from accessing an object according to the DRM system.

A proximity checking unit 2760 performs proximity checking on devices. Proximity checking is performed during registration of a device. Adopting only a domain is not enough to prevent illegal distribution of content via the Internet. If there are no restrictions to hop-count or a duration of content transfer, a user over a domain can distribute content via the Internet without a permission, and thus, proximity checking for spatial restrictions is required. Proximity checking is performed through measurement of RTT and/or TTL.

A mechanism for protecting content from security dangers according to an exemplary embodiment of the present invention will now be described. Every device supporting the DRM system is given a unique identifier (UID), a pair of keys including a public key PUB_conf and a private key PRIV_conf, a certificate, and a secret key SEC_conf, which are generated by an authority.

The private key PRIV_conf and the secret key SEC_conf are securely stored in each device and are not disclosed to the outside.

The certificate is stored in a device compatible in the DRM system and used for authentication. Each device may further store the other restrictions or keys required to execute a scenario.

Every device over a domain is given a pair of keys: a public key and a private key. Alternatively, every device may be given a domain key that is a secret key. The domain key is securely distributed during registration or deregistration.

The content key is encrypted using a sharing public key PUB_shar and linked to a rights object. When a device is canceled from the domain, the construction of the domain must be updated. In this case, each of the remaining devices joining the domain must be given a new domain key.

Content should not be available to devices that are determined to be insecure. If a content key is encrypted using a revocation key, only secure devices are permitted to acquire the content key encrypted using the revocation key.

Every device is required to update the existing revocation information with the latest revocation information. The latest revocation information is generated by an authority and transmitted together with the content to devices.

Content used in the DRM system is an object encrypted securely using a content key. The encrypted content is packaged into a predetermined format or a storage medium, which are defined in a separate specification. The content key is protected using a revocation key to prevent an unauthorized device from accessing the content.

There are two types of authentication: authentication between a domain manager and a device, and authentication between two devices. The former authentication is based on a certificate, revocation checking, and proximity checking. The latter authentication requires only proximity checking.

A domain manager creates a domain key, a sharing public key PUB_shar and a sharing private key PRIV_shar, alternatively, a sharing secret key SEC_shar. The domain manager encrypts the sharing private key PRIV_shar using a public confidentiality key PUB_conf and transmits the result of encryption to each device belonging to the domain.

Security architecture according to an exemplary embodiment of the present invention uses broadcast encryption-based HBES as a revocation mechanism. Broadcast encryption forms a revocation tree, and the revocation tree is a tree type structure in which a set of users or devices are allocated to leaf nodes.

Figure 28:
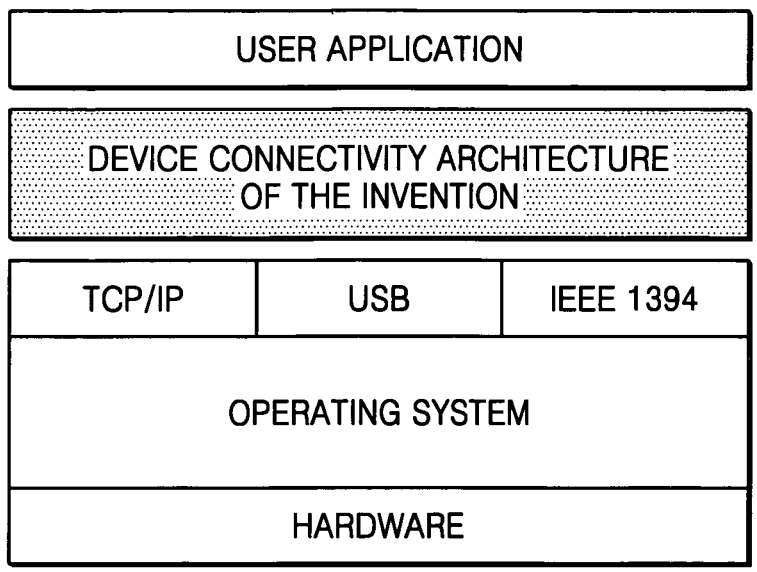
FIG. 28 is a diagram illustrating the location of an architecture for connectivity in a system layer according to an exemplary embodiment of the present invention.

Hereinafter, device connectivity according to an exemplary embodiment of the present invention will be described. FIG. 28 is a diagram illustrating the location of connectivity architecture in a system layer according to an exemplary embodiment of the present invention.

With reference to FIG. 28, architecture for connectivity between a home server and a device or between devices over a home network will now be described. The architecture is designed to transmit control information and data between devices over a network and to further provide universal identification, convenient description, and easy discovery of a device.

Like UPnP, the architecture is designed to support automatic detection of a device for a broad range of network interface protocols including TCP/IP, USB, and IEEE1394 without regard to an operating system or a hardware manufacturer.

The architecture supports connectivity independent of network layer protocols, and thus does not assume a specific message format. To obtain independence, the architecture includes a protocol stack such as that illustrated in FIG. 29.

Figure 29:
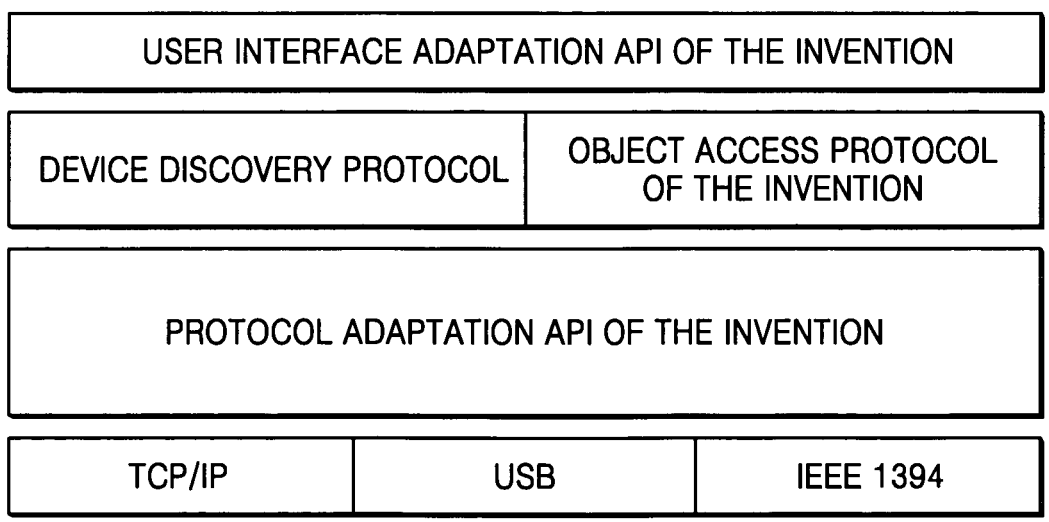
FIG. 29 is a diagram of a protocol stack according to an exemplary embodiment of the present invention.

FIG. 29 is a diagram of a protocol stack according to an exemplary embodiment of the present invention. Referring to FIG. 29, messages from each layer are hosted in a protocol defined in architecture for connectivity according to an exemplary embodiment of the present invention. A message from a user interface layer is formatted using a protocol for accessing the architecture for connectivity. Thereafter, the formatted message is formatted using a specific network protocol defined in a network or an upper layer of the user interface layer (a transport layer or a session layer).

A basic assumption for architecture for connectivity is a unique object naming service. A unique object naming protocol (UONP) is provided to support this service.

When devices are initially connected to a home network, each device should have a unique object name (UON). When the home network is managed, that is, when a UONP server is operated, each device must use its UON given by the UONP server or have a UONP client that generates a UON. In the case of a network managed by the UPnP, the UON may be an Internet protocol (IP) address.

When a device is added to a manageable home network, a device discovery protocol (DDP) for the architecture for connectivity allows the added device to advertise description of the added device to a device connectivity controller (DCC) over the home network. In addition, the DDP makes the DCC search for a device over the home network. One of the messages required very often in both transactions is a discovery message. The discovery message describes the type, UON, and a receiving capability of a device.

The architecture for connectivity requires a device description in addition to the discovery message since, in general, the discovery message does not specify the added device and the capabilities of the added device. The DCC reads the device description to learn services of the DCC. The description message device includes details of the device and a list of possible services and device capabilities, for example, public-key cryptosystem and an RSA encryption.

The followings are requirements of the architecture connectivity, a description of each is provided below:

1) R.001: Uniqueness

Each device should have a unique device identifier, which is a basic assumption for device connectivity.

2) R.002: Independence of Network Interface

Each device should be capable of transmitting a control signal and data to other devices not considering network interfaces such as TCP/IP, USB, and IEEE1394.

3) R.003: XML syntax

Each device over a manageable network should be capable of exchanging a message of XML serialization syntax during device discovery and transmission of a description.

Detailed specifications of the architecture for connectivity are described below. The uniqueness of an object is a basic assumption of Marlin device connectivity architecture (MDCA). Through a unique object naming service, a device acquires its UON. The unique object naming service enables the DCC to detect a device over a network and the device to describe its service and capabilities.

If a UONP server can operate in the network, a UON is automatically allocated to each device over the network. Otherwise, each device creates its own UON before joining the network, which is described in greater detail below.

In operation 1, whether the UONP server is available is determined. If the UONP server is available, a device requests the UONP server to allocate a UON to the device. If not, the device creates its own UON.

In operation 2, the UON of the device is determined. In this case, the device uses an algorithm for generating the UON.

In operation 3, whether the determined UON is unique is verified. That is, whether the UON obtained in operation 2 has been used by other devices is determined. If the obtained UON has been used, a new UON is created and whether the new UON is unique is verified again.

In operation 4, the capabilities of the UONP server are periodically checked. The device creating its own UON must periodically check the capabilities of the UONP server of the network.

Figure 30:
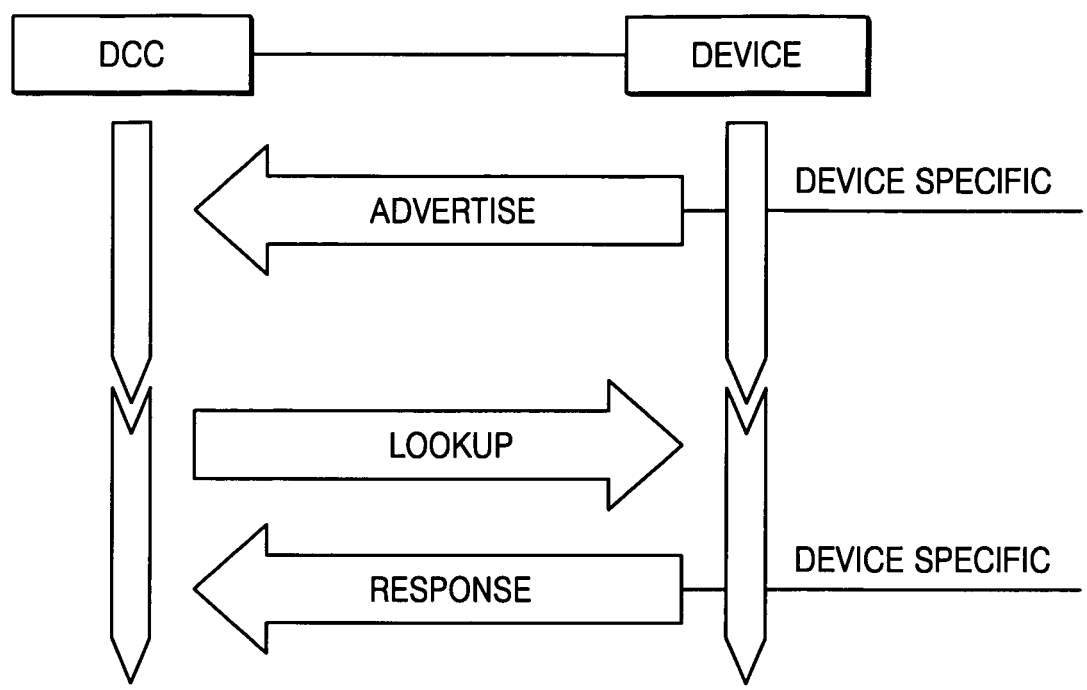
FIG. 30 is a diagram illustrating device discovery according to an exemplary embodiment of the present invention.

FIG. 30 is a diagram illustrating device discovery according to an exemplary embodiment of the present invention. Using a discovery algorithm, a DCC or a device is capable of discovering or recognizing a device which can operate in a network. If a new device is added to the network, the new device transmits a discovery message to all the other devices over the network at the same instant. Whenever receiving a discovery message, the other devices should respond to the discovery message.

Alternatively, the DCC may transmit a discovery message informing of the appearance of the new device to the other devices for device discovery.

Discovery protocols are classified into two types:

(1) Advertisement: When a new device joins a network, the new device advertises and specifies its appearance to the other devices using a device discovery protocol. Then, the other devices can recognize the addition of the new device to the network.

(2) Look-Up: When a device which can act as the DCC joins the network, it is necessary that this device learns the currently available devices. Through a DDP, the DCC recognizes the currently available devices when other devices respond to a look-up message.

Figure 31:
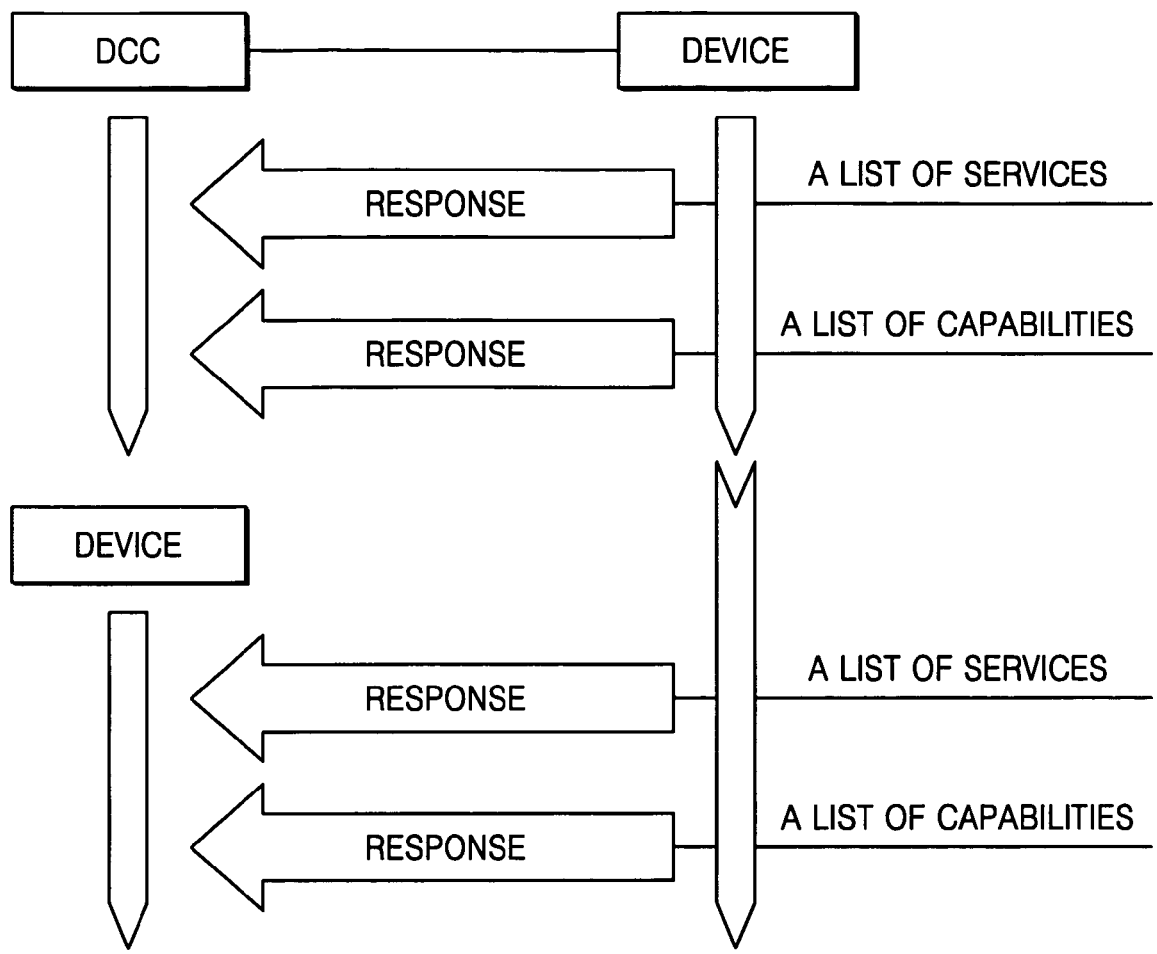
FIG. 31 is a diagram illustrating a description protocol according to an exemplary embodiment of the present invention.

FIG. 31 is a diagram illustrating a description protocol according to an exemplary embodiment of the present invention. Even if a device detects other devices, the existing devices can hardly learn information regarding a new device. That is, through a discovery protocol, the existing devices can obtain only specific information regarding the new device such as the type and UON of the new device.

To learn more about the capabilities of the other devices or communicate with the other devices, a device must search for the capabilities and description of the other devices, using given information regarding the other devices.

A service description specifies possibility of rendering services like digital/analog services, possibility of storage, and a list of connection services such as TCP/IP, USB, and IEEE1394. A capability description specifies streaming without connection, encrypting/decrypting a secret key, and encrypting/decrypting a public key.

The device description protocol has the following four operations:

(1) Acquire a service description: When the MDCC desires to recognize a description regarding a device, it transmits a Service-Description-Get message to the device based on a discovery message.

(2) Respond to the service description: In receipt of the Service-Description-Get message, the device responds to it.

(3) Acquire a capability description: When the MDCC wants to learn service capabilities of the device, the MDCC transmits a Capability-Description-Get message to the device.

(4) Respond to the capability description: In receipt of the Capability-Description-Get message, the device responds to it.

Figure 32:
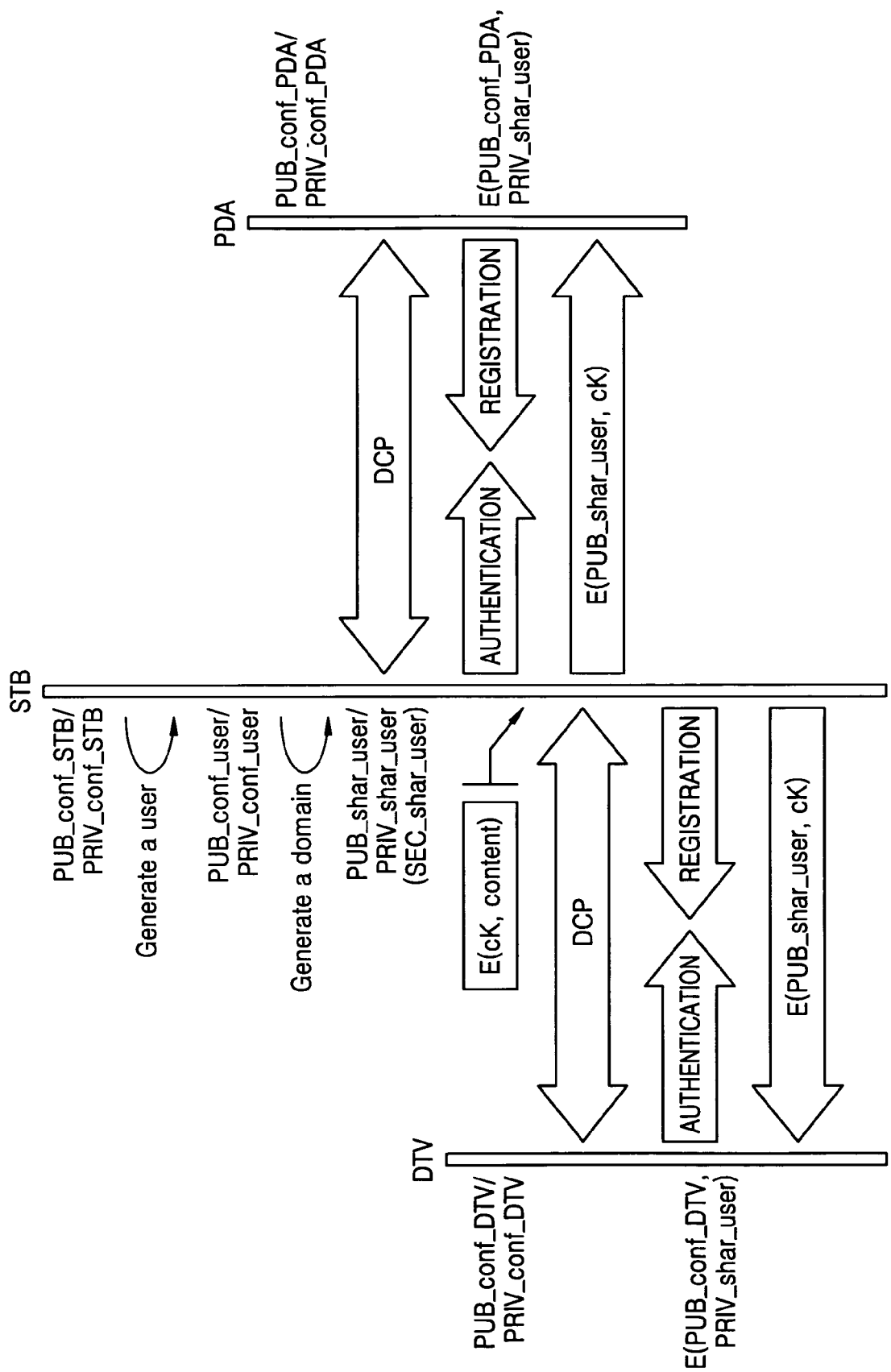
FIG. 32 illustrates a scenario in which content is used using a digital rights management (DRM) system according to an exemplary embodiment of the present invention.

FIG. 32 illustrates a scenario in which content is used using a DRM system according to an exemplary embodiment of the present invention. The scenario presents an example showing how Alice uses content in her house after the content has been broadcast. It is assumed that the content is broadcast to Alice via a terrestrial channel and devices that she is holding are capable of performing all of the above functions.

It is also assumed that Alice possesses a digital television (DTV) and has purchased a new set-top box (STB) that can receive content broadcast by a terrestrial broadcasting station. To share the content among the devices, she must generate a user node in the STB. The user node represents her domain by a given name "Alice's Home". In this exemplary embodiment, it is assumed that there is only one user node.

When a user node is created, a pair of keys: a public confidentiality key PUB_conf_user and a private confidentiality key PRIV_conf_user, are created and allocated to Alice. Then, she can generate her new domain "Alice's Home". Next, a pair of keys: a sharing public key PUB_shar_user and a sharing private key PRIV_shar_user, are created and allocated to a specific domain. A sharing secret key SEC_shar_user may further be created and allocated to the specific domain.

A domain is characterized by a private key or a secret key. When the content is bound to the user node, a device cannot access the content without the sharing private key PRIV_shar_user, which is a domain key.

Next, she registers a STB device node to her domain using the pair of keys (the public confidentiality key PUB_conf_user and the private confidentiality key PRIV_conf_user). Initially, her domain has been empty. After registering the STB device node, she desires to register the DTV to her domain. For registration, a domain manager performs authentication to determine whether the DTV is qualified to be registered to her domain.

For authentication, the domain manager estimates proximity between the DTVs and verifies whether the DTV has been revoked. The newest device has the latest revocation information. When that two devices have revocation information of different versions is determined during authentication, the older revocation information is replaced with the newer revocation information. Revocation checking is performed only when the result of proximity falls within a predetermined range. If the result of proximity does not fall within the predetermined range, authentication is discontinued and registration is denied.

When authentication is successful, the home server transmits the domain key PRIV_shar_user to the DTV. In this case, the domain key PRIV_shar_user is encrypted to E(PUB_conf_user, PRIV_shar_user) and transmitted to the DTV. Accordingly, a link is established between the user node and a node of the DTV.

Content is encrypted using a content key cK. The content key is encrypted to E(PUB_shar_user, cK) using the domain key. If a device is a legal member of the domain, the device can obtain the content key cK using the user's sharing private key PRIV_shar_user. Then, the content can be shared between nodes of the devices joining her domain.

A domain configuration will now be described. It is assumed that Alice buys a device such as a personal digital assistant (PDA), and adds it to her domain. In this case, the domain configuration is simple. If authentication allows the PDA to be registered to her domain, the domain manager transmits the domain key PRIV_shar_user to the PDA.

When the PDA is out of order and she wants to remove the PDA from her domain, a pair of keys including a new sharing public key PUB_shar_user_new and a new sharing private key PRIV_shar_user_new, are created and the new sharing public key PUB_shar_user_new is allocated as a domain key. The domain key PUB_shar_user_new is distributed to only the remaining three devices joining her domain. Next, the content key is encrypted to E(PUB_shar_user_new, cK) using a new domain key.

If the content is bound to a device, the other devices cannot obtain the content key without a private confidentiality key PRIV_conf_STB of the device.

Key management, user registration and deregistration, and device deregistration according to an exemplary embodiment of the present invention can be embodied as a computer program. Codes and code segments of the program could have been easily derived by computer programmers. Also, the program may be stored in a computer readable medium, and key management, user registration and deregistration, and device deregistration according to an exemplary embodiment of the present invention are performed when the program is read and executed using a computer. The computer readable media may be a magnetic recording medium or an optical recording medium.

As described above, key management, user registration/deregistration, and revocation are performed using a hierarchical node topology, thereby realizing a DRM system that protects content and easily accomplishes a binding mechanism and a revocation mechanism.

Also, one of a public key and a symmetrical key of a user may be selected as an encryption domain key, thereby allowing various DRM systems to be realized. Since the symmetrical key has a small size, it is proper to embody a system capable of reducing the speed of encryption. Use of the public key makes it easy to embody a system that uses the existing, various protocols.

In particular, in user deregistration, revocation information is updated to allow a home server to effectively and speedily revoke a device.

While this invention has been particularly shown and described with reference to exemplary embodiments thereof, it will be understood by those skilled in the art that various changes in form and details may be made therein without departing from the spirit and scope of the invention as defined by the appended claims and their equivalents.

What is claimed is:

1. A key management method using a hierarchical node topology in a home network including a home server, a transmitting node and a receiving node, the key management method comprising:
    creating node information by allocating to each node of the transmitting node and the receiving node a public key and a private key;
    generating by the home server, link information using the public key and the private key of each node of the transmitting node and the receiving node; and
    delivering a content key from an upper node to a lower node,
    wherein the link information is obtained by the home server by encrypting a private key of the receiving node with a public key of the transmitting node.

2. The key management method of claim 1, wherein:
    the transmitting node is a device node corresponding to a device of the home network,
    the link information is obtained by encrypting the private key of the receiving node with a public confidentiality key of the device node, and
    a private confidentiality key of the device node is possessed only by the device.

3. The key management method of claim 1, wherein the transmitting node is not the device node, and the link information is obtained by encrypting the private key of the receiving node with a sharing public key of the transmitting node.

4. The key management method of claim 1, wherein the public key and the private key are replaced with a symmetrical key.

5. The method of claim 1, wherein a node tree is created by said creating of node information and generating of the link information, and wherein the content key is delivered from the upper node to the lower node using the node tree.

6. The method of claim 1, wherein the content key is delivered securely from the upper node to the lower node, and wherein the secure delivery indicates that the link information cannot be accessed from outside of the home network.

7. The method of claim 1, wherein the upper node is the receiving node and comprises at least one of a user, a family of users, and a device of a home network, and wherein the lower node is the transmitting node and comprises a device of a home network.

8. The method of claim 1, wherein the receiving node is a user node that forms a plurality of domains in the home network.

9. The method of claim 1, further comprising:
generating a node tree upon a user request;
creating a domain key;
wherein the domain key belongs to the domain that provides access to a unit of content to the upper node which is a user node and to the lower node which is a device.

10. A key management method using a hierarchical node topology in a home network, the key management method comprising:
creating node information by allocating to each node a public key and a private key;
generating link information using the public key and the private key of each node; and
delivering a content key from an upper node to a lower node,
wherein the link information is obtained by encrypting a private key of a receiving node with a public key of a transmitting node, and wherein the delivering of the content key comprises:
encrypting the content key using a revocation key; and
encrypting the encrypted content key using the public key,
wherein the revocation key is selected from device keys that are not allocated to devices to be revoked, through broadcast encryption.

11. A key management method using a hierarchical node topology in a home network, the key management method comprising:
creating node information by allocating to each node a public key and a private key;
generating link information using the public key and the private key of each node; and
delivering a content key from an upper node to a lower node,
wherein the link information is obtained by encrypting a private key of a receiving node with a public key of a transmitting node, and the key management method further comprises:
encrypting the content key using the revocation key and an encryption domain key and transmitting the encrypted content key to a device; and
acquiring, by the device, the content key using the revocation key extracted from a device key of the device and a decryption domain key,
wherein the decryption domain key is generated using a private confidentiality key of the device and the link information.

12. The key management method of claim 11, wherein the encryption domain key is a sharing public key of a user, and the acquiring of the content key comprises:
obtaining the decryption domain key using the private confidentiality key of the device and the link information; and
obtaining the content key by decrypting the encrypted content key using the decryption domain key.

13. The key management method of claim 12, wherein the obtaining of the decryption domain key (ddK) is performed by:

$$ddK = D(\text{PRIV\_conf\_dev}, LI)$$
$$= D(\text{PRIV\_conf\_dev}, E(\text{PUB\_conf\_dev}, \text{PRIV\_shar\_user}))$$
$$= \text{PRIV\_shar\_user},$$

wherein PRIV_conf_dev denotes the private confidentiality key of the device, LI denotes the link information, PRIV_shar_user denotes the sharing private key of the user, D stands for decryption, and E stands for encryption.

14. The key management method of claim 13, wherein the obtaining of the content key (cK) is performed by:

$$cK = D(\text{Revocation\_key}, D(\text{PRIV\_shar\_user}, EECK))$$
$$= D(\text{Revocation\_key}, D(\text{PRIV\_shar\_user}, E(\text{PUB\_shar\_user}, ECK)))$$
$$= D(\text{Revocation\_key}, ECK)$$
$$= D(\text{Revocation\_key}, E(\text{Revocation\_key}, cK)) = cK,$$

wherein LI denotes the link information, and PRIV_shar_user and PUB_shar_user denote the sharing private key and the sharing public key of the user, respectively.

15. A key management method using a hierarchical node topology in a home network, the key management method comprising:
creating node information by allocating to each node a public key and a private key;
delivering a content key from an upper node to a lower node;
encrypting the content key using the revocation key and an encryption domain key and transmitting the encrypted content key to a device; and
acquiring, by the device, the content key using the revocation key extracted from a device and a decryption domain key,
wherein the encryption domain key is the public confidentiality key of the device, the decryption domain key is a private confidentiality key of the device, and the acquiring of the content key comprises binding content to the device by obtaining the content key using the private confidentiality key of the device.

16. The key management method of claim 15, wherein the binding of the content to the device is performed by:

$$cK = D(\text{Revocation\_key}, D(\text{PRIV\_conf\_dev}, EECK))$$
$$= D(\text{Revocation\_key}, D(\text{PRIV\_conf\_dev}, E(\text{PUB\_conf\_dev}, ECK)))$$
$$= D(\text{Revocation\_key}, ECK)$$
$$= D(\text{Revocation\_key}, E(\text{Revocation\_key}, cK)) = cK,$$

wherein cK is a content key, PRIV_conf_dev and PUB_conf_dev denote the private confidentiality key and the public confidentiality key of the device, respectively, LI denotes link information, PRIV_shar_user denotes the sharing private key of the user, D stands for decryption, and E stands for encryption.

17. A non-transitory computer readable recording medium having embodied thereon a program for executing a key management method in a home network including a home server, a transmitting node and a receiving node, the key management method comprising:
  creating node information by allocating to each node of the transmitting node and the receiving node a public key and a private key;
  generating by the home server, link information using the public key and the private key of each node of the transmitting node and the receiving node; and
  delivering a content key from an upper node to a lower node,
  wherein the link information is obtained by the home server by encrypting a private key of the receiving node with a public key of the transmitting node.

* * * * *